US012459261B2

(12) United States Patent
Kobayashi

(10) Patent No.: US 12,459,261 B2
(45) Date of Patent: Nov. 4, 2025

(54) LIQUID EJECTING HEAD AND LIQUID EJECTING APPARATUS

(71) Applicant: SEIKO EPSON CORPORATION, Tokyo (JP)

(72) Inventor: Haruki Kobayashi, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 136 days.

(21) Appl. No.: 18/581,033

(22) Filed: Feb. 19, 2024

(65) Prior Publication Data

US 2024/0278567 A1 Aug. 22, 2024

(30) Foreign Application Priority Data

Feb. 20, 2023 (JP) ................................ 2023-024069

(51) Int. Cl.
*B41J 2/14* (2006.01)
*B41J 2/175* (2006.01)

(52) U.S. Cl.
CPC ......... *B41J 2/1433* (2013.01); *B41J 2/14233* (2013.01); *B41J 2/175* (2013.01)

(58) Field of Classification Search
CPC ........ B41J 2/14; B41J 2/14233; B41J 2/1433; B41J 2002/14241; B41J 2002/114362; B41J 2002/14419
See application file for complete search history.

(56) References Cited

U.S. PATENT DOCUMENTS 8,757,782 B2 * 6/2014 Watanabe ................ B41J 2/055 347/84
9,022,528 B2 * 5/2015 Watanabe ............ B41J 2/14233 347/50
2014/0240401 A1 * 8/2014 Okubo ................ B41J 2/17523 347/47

FOREIGN PATENT DOCUMENTS

JP 2015-039804 A 3/2015

* cited by examiner

*Primary Examiner* — Anh T Vo
(74) *Attorney, Agent, or Firm* — Harness, Dickey & Pierce, P.L.C.

(57) ABSTRACT

A liquid ejecting head includes head chips ejecting a liquid in a first-direction, a fixed plate having a flat plate portion to which the head chips are fixed, and a holder having a flow path forming portion provided with first-coupling-flow-paths that are open in the first-direction, the head chip has a flow path pipe in which a second-coupling-flow-path is provided and which protrudes in a second-direction opposite to the first-direction, and in a state where the flow path pipe is inserted into the first-coupling-flow-path, the first-coupling-flow-path communicates with the second-coupling-flow-path in a liquid-tight manner via an elastic sealing member disposed between an inner peripheral surface of the first-coupling-flow-path and an outer peripheral surface of the flow-path-pipe when viewed in the first-direction.

20 Claims, 20 Drawing Sheets

LIQUID EJECTING HEAD AND LIQUID EJECTING APPARATUS

The present application is based on, and claims priority from JP Application Serial Number 2023-024069, filed Feb. 20, 2023, the disclosure of which is hereby incorporated by reference herein in its entirety.

BACKGROUND

1. Technical Field

The present disclosure relates to a liquid ejecting head and a liquid ejecting apparatus.

2. Related Art

In the related art, a liquid ejecting apparatus typified by an ink jet type printer generally includes a liquid ejecting head that ejects a liquid such as an ink as a droplet.

For example, a liquid ejecting head disclosed in JP-A-2015-39804 includes a head chip that ejects an ink from a nozzle, and a flow path structure that holds the head chip and supplies an ink to the head chip. Here, the head chip is provided with an inlet, and the head chip is fixed to a flow path member by an adhesive provided around the inlet, whereby the inlet is liquid-tightly coupled to an outlet of a flow path of the flow path structure.

In the liquid ejecting head, for example, when the head chip fails, there is a demand to regenerate the liquid ejecting head by replacing only the head chip. In addition, when a portion of the liquid ejecting head other than the head chip fails, there is a demand to reuse the head chip by removing the non-failed head chip from the flow path structure and mounting it on another liquid ejecting head.

However, in the liquid ejecting head disclosed in JP-A-2015-39804, the inlet of the head chip and the outlet of the flow path structure are coupled to each other via the adhesive, so that it is difficult to separate the head chip and the flow path structure. Under such circumstances, it is desired to realize a liquid ejecting head capable of regenerating the liquid ejecting head by replacing the head chip or capable of reusing the head chip as a portion of another liquid ejecting head, while preventing misalignment of the head chip.

SUMMARY

According to an aspect of the present disclosure, there is provided a liquid ejecting head including: a plurality of head chips each having a nozzle plate provided with a plurality of nozzles that eject a liquid in a first direction; a fixed plate having a flat plate portion that is provided with a plurality of exposure opening portions for exposing, to an outside, at least a portion of each of a plurality of the nozzle plates and to which the plurality of head chips are fixed; and a holder having a flow path forming portion provided with a plurality of first coupling flow paths that are open in the first direction and a wall portion protruding from the flow path forming portion in the first direction and fixed to the flat plate portion, in which the plurality of head chips are accommodated in an accommodation space defined by the flat plate portion, the flow path forming portion, and the wall portion, at least one head chip among the plurality of head chips has a flow path pipe in which a second coupling flow path is provided and which protrudes in a second direction opposite to the first direction, and in a state where the flow path pipe is inserted into any one first coupling flow path among the plurality of first coupling flow paths, the one first coupling flow path communicates with the second coupling flow path in a liquid-tight manner via an elastic sealing member disposed between an inner peripheral surface of the one first coupling flow path and an outer peripheral surface of the flow path pipe when viewed in the first direction.

According to another aspect of the present disclosure, there is provided a liquid ejecting head including: a plurality of head chips each having a nozzle plate provided with a plurality of nozzles that eject a liquid in a first direction; a fixed plate having a flat plate portion that is provided with a plurality of exposure opening portions for exposing, to an outside, at least a portion of each of a plurality of the nozzle plates and to which the plurality of head chips are fixed; and a holder having a flow path forming portion provided with a plurality of first coupling flow paths that are open in the first direction and a wall portion protruding from the flow path forming portion in the first direction and fixed to the flat plate portion, in which the plurality of head chips are accommodated in an accommodation space defined by the flat plate portion, the flow path forming portion, and the wall portion, at least one head chip among the plurality of head chips has a second coupling flow path communicating with at least a portion of the plurality of nozzles, the flow path forming portion has a flow path pipe in which any one first coupling flow path among the plurality of first coupling flow paths is provided and which protrudes in the first direction, and in a state where the flow path pipe is inserted into the second coupling flow path, the one first coupling flow path communicates with the second coupling flow path in a liquid-tight manner via an elastic sealing member disposed between an inner peripheral surface of the second coupling flow path and an outer peripheral surface of the flow path pipe when viewed in the first direction.

According to still another aspect of the present disclosure, there is provided a liquid ejecting apparatus including: the liquid ejecting head according to any one of the above-described aspects; and a controller controlling an operation of the liquid ejecting head.

DESCRIPTION OF EMBODIMENTS

Figure 1:
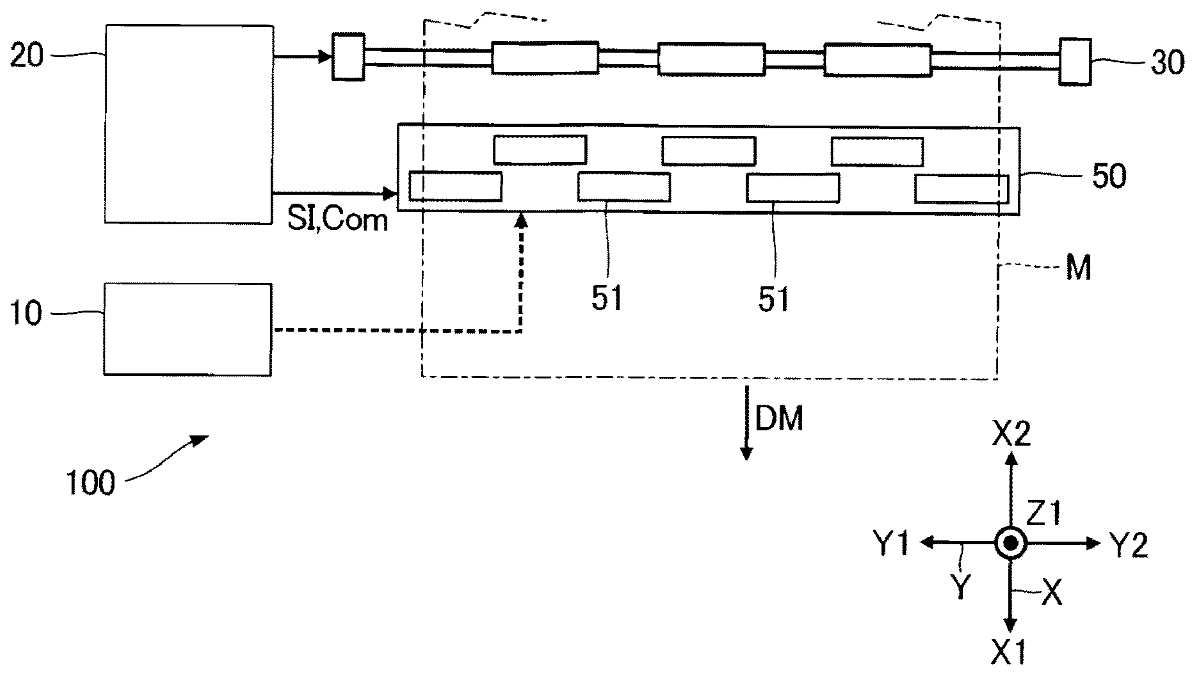
FIG. 1 is a schematic view illustrating a configuration example of a liquid ejecting apparatus according to a first embodiment.

Hereinafter, preferred embodiments according to the present disclosure will be described with reference to the accompanying drawings. In the drawings, dimensions and scales of each portion are appropriately different from actual ones, and some portions are schematically illustrated to facilitate understanding. In addition, the scope of the present disclosure is not limited to the forms unless the present disclosure is particularly limited in the following description.

The following description will be performed by using an X axis, a Y axis, and a Z axis that intersect each other as appropriate. In addition, one direction along the X axis is referred to as an X1 direction, and a direction opposite to the X1 direction is referred to as an X2 direction. Similarly, directions opposite to each other along the Y axis are referred to as a Y1 direction and a Y2 direction. In addition, directions opposite to each other along the Z axis are referred to as a Z1 direction and a Z2 direction. The Z2 direction is an example of a "first direction", and the Z1 direction is an example of a "second direction". In the following, viewing in the direction along the Z axis is referred to as "plan view".

Here, typically, the Z axis is a vertical axis, and the Z2 direction corresponds to a downward direction in a vertical direction. Note that the Z axis does not have to be the vertical axis. In addition, the X axis, the Y axis, and the Z axis are typically orthogonal to each other. However, without being limited to this, all of these need only intersect each other at an angle within a range of, for example, 80° or more and 100° or less.

1. First Embodiment

1-1. Schematic Configuration of Liquid Ejecting Apparatus

FIG. 1 is a schematic view illustrating a configuration example of a liquid ejecting apparatus 100 according to a first embodiment. The liquid ejecting apparatus 100 is an ink jet type printing apparatus that ejects an ink, which is an example of a liquid, onto a medium M as a droplet. The medium M is typically a printing sheet. The medium M is not limited to the printing sheet, and may be, for example, a printing target having any desired material such as a resin film or a cloth.

As illustrated in FIG. 1, the liquid ejecting apparatus 100 has a liquid container 10, a control unit 20, a transport mechanism 30, and a liquid ejecting head 50. The control unit 20 is an example of a "controller".

The liquid container 10 is a container that stores an ink. Specific examples of the liquid container 10 include a cartridge that is attachable to and detachable from the liquid ejecting apparatus 100, a bag-like ink pack formed of a flexible film, and an ink tank that can be refilled with an ink. A type of the ink stored in the liquid container 10 is not particularly limited, and is set in any desired way.

The control unit 20 controls an operation of each element of the liquid ejecting apparatus 100. The control unit 20 includes, for example, a process circuit such as a central processing unit (CPU) or a field programmable gate array (FPGA) and a storage circuit such as a semiconductor memory, and controls an operation of each element of the liquid ejecting apparatus 100.

The transport mechanism 30 transports the medium M in a direction DM under the control of the control unit 20. The direction DM of the present embodiment is the X1 direction. In the example illustrated in FIG. 1, the transport mechanism 30 includes a transport roller that is elongated along the Y axis, and a motor that rotates the transport roller. The transport mechanism 30 is not limited to the configuration using the transport roller, and may be configured to use, for example, a drum or an endless belt that transports the medium M in a state of being attracted to an outer peripheral surface by electrostatic force or the like.

Under the control of the control unit 20, the liquid ejecting head 50 ejects the ink supplied from the liquid container 10 onto the medium M in the Z2 direction from each of a plurality of nozzles N. The liquid ejecting head 50 is a line head that has a plurality of head chips 51 disposed such that the plurality of nozzles are distributed over the entire range of the medium M in the direction along the Y axis, and that is elongated in the direction in which the Y axis extends. When the ejection of the ink from the liquid ejecting head 50 is performed in parallel with the transport of the medium M by the transport mechanism 30, an image is formed at a surface of the medium M by means of the ink.

The number and the disposition of the head chips 51 included in the liquid ejecting head 50 are not limited to the example illustrated in FIG. 1, and are set in any desired way. In addition, when the liquid ejecting head 50 is configured to circulate the ink, the liquid ejecting head 50 may be coupled to the liquid container 10 via a circulation mechanism for circulating the ink in the liquid ejecting head 50.

1-2. Configuration Example of Head Chip

Figure 2:
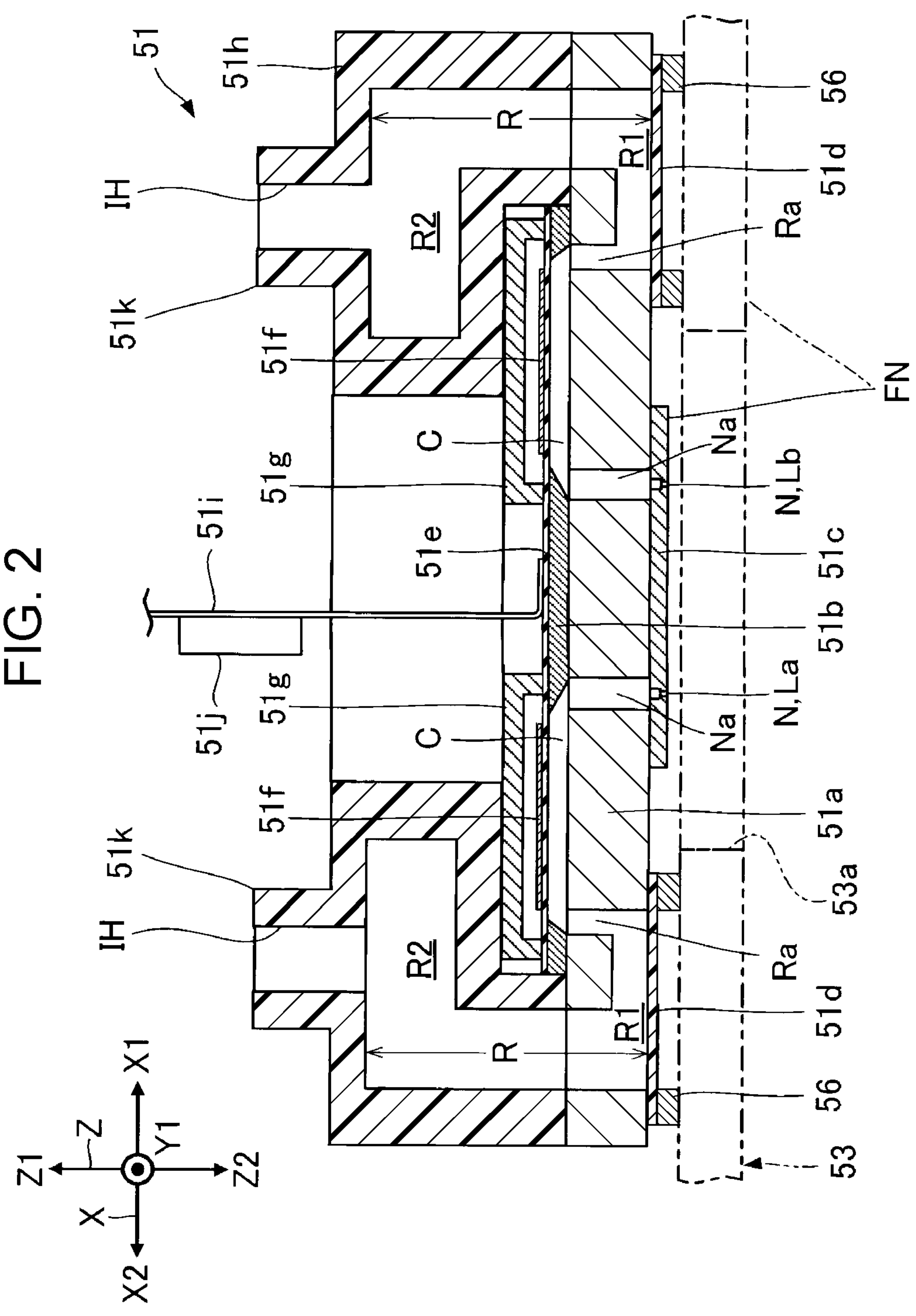
FIG. 2 is a cross-sectional view illustrating an example of a head chip of the first embodiment.

FIG. 2 is a cross-sectional view illustrating an example of the head chip 51 of the first embodiment. The head chip 51 has a substantially symmetrical configuration in the direction along the X axis. Note that positions of a plurality of nozzles N of a nozzle row La and a plurality of nozzles N of a nozzle row Lb in the direction along the Y axis may coincide with or may be different from each other. FIG. 2 illustrates a configuration in which the positions of the plurality of nozzles N of the nozzle row La and the plurality of nozzles N of the nozzle row Lb in the direction along the Y axis coincide with each other.

As illustrated in FIG. 2, the head chip 51 includes a flow path substrate 51*a*, a pressure chamber substrate 51*b*, a nozzle plate 51*c*, a vibration absorbing body 51*d*, a vibration plate 51*e*, a plurality of drive elements 51*f*, a protective plate 51*g*, a case 51*h*, and a wiring substrate 51*i*.

The flow path substrate 51*a* and the pressure chamber substrate 51*b* are stacked in this order in the Z1 direction, and form a flow path for supplying the ink to the plurality of nozzles N. The vibration plate 51*e*, the plurality of drive elements 51*f*, the protective plate 51*g*, the case 51*h*, and the wiring substrate 51*i* are installed in a region located in the Z1 direction with respect to a stacked body formed of the flow path substrate 51*a* and the pressure chamber substrate 51*b*. On the other hand, the nozzle plate 51*c* and the vibration absorbing body 51*d* are installed in a region located in the Z2 direction with respect to the stacked body. Each element of the head chip 51 is schematically a plate-shaped member elongated in the Y direction, and the elements are joined to each other by, for example, using an adhesive. Hereinafter, each element of the head chip 51 will be described in order.

The nozzle plate 51*c* is a plate-shaped member provided with the plurality of nozzles N of each of the nozzle row La and the nozzle row Lb. Each of the plurality of nozzles N is a through-hole through which an ink passes. A surface of the nozzle plate 51*c* facing the Z2 direction constitutes a portion of an ejection surface FN.

A space R1, a plurality of individual flow paths Ra, and a plurality of communication flow paths Na are provided in the flow path substrate 51*a* for each of the nozzle row La and the nozzle row Lb. The space R1 is an elongated opening extending in the direction along the Y axis in plan view in the direction along the Z axis. Each of the individual flow paths Ra and the communication flow paths Na is a through-hole formed for each nozzle N. Each individual flow path Ra communicates with the space R1. In the present specification, the term "communication" includes not only an aspect in which two target spaces are directly coupled to form one space but also an aspect in which two target spaces are coupled via another space to form one space.

The pressure chamber substrate 51*b* is a plate-shaped member provided with a plurality of pressure chambers C for each of the nozzle row La and the nozzle row Lb. The plurality of pressure chambers C are arranged in the direction along the Y axis. Each of the pressure chambers C is formed for each nozzle N, and is an elongated space extending in the direction along the X axis in plan view.

The pressure chamber C is a space located between the flow path substrate 51*a* and the vibration plate 51*e*. The plurality of pressure chambers C are arranged in the direction along the Y axis for each of the nozzle row La and the nozzle row Lb. In addition, the pressure chamber C communicates with each of the communication flow path Na and the individual flow path Ra. Therefore, the pressure chamber C communicates with the nozzle N via the communication flow path Na, and communicates with the space R1 via the individual flow path Ra.

The vibration plate 51*e* is disposed on a surface of the pressure chamber substrate 51*b* facing the Z1 direction. The vibration plate 51*e* is a plate-shaped member that can elastically vibrate. For example, the vibration plate 51*e* has an elastic film made of silicon oxide ($SiO_2$) and an insulating film made of zirconium oxide ($ZrO_2$), and these films are stacked in this order in the Z1 direction. The vibration plate 51*e* is not limited to the above-described configuration in which the elastic film and the insulating film are stacked, and may be, for example, configured of a single layer or three or more layers.

The plurality of drive elements 51*f* mutually corresponding to the nozzles N are disposed on a surface of the vibration plate 51*e* facing the Z1 direction for each of the nozzle row La and the nozzle row Lb. Each of the drive elements 51*f* is a passive element that deforms when supplied with a drive signal. Each drive element 51*f* has an elongated shape extending in the direction along the X axis in plan view. The plurality of drive elements 51*f* are arranged in the direction along the Y axis to correspond to the plurality of pressure chambers C. The drive element 51*f* overlaps the pressure chamber C in plan view.

Each drive element 51*f* is a piezoelectric element, and although not illustrated, the drive element 51*f* has a first electrode, a piezoelectric layer, and a second electrode, which are stacked in this order in the Z1 direction. One of the first electrode and the second electrode is an individual electrode disposed to be separated from another electrode of the same type for each drive element 51*f*, and a drive signal Com is supplied to the one electrode. The other of the first electrode and the second electrode is a band-shaped common electrode extending in the direction along the Y axis to be continuous over the plurality of drive elements 51*f*, and for example, a constant potential is supplied to the other electrode. The piezoelectric layer is made of a piezoelectric material such as lead zirconate titanate ($Pb(Zr, Ti)O_3$), and for example, has a band shape extending in the direction along the Y axis to be continuous over the plurality of drive elements 51*f*. Note that the piezoelectric layer may be integrated over the plurality of drive elements 51*f*. In this case, the piezoelectric layer is provided with a through-hole penetrating the piezoelectric layer to extend in the direction along the X axis in a region corresponding to, in plan view, a gap between the pressure chambers C adjacent to each other. When the vibration plate 51*e* vibrates in conjunction with deformation of the drive element 51*f* due to the supply of the drive signal Com to the individual electrode, the pressure inside the pressure chambers C fluctuates to eject the ink from the nozzle N. The drive element 51*f* is not limited to a piezoelectric element, and may be a heat generating element that ejects the ink from the nozzle N using a bubble generated by generating heat in the ink in the pressure chamber C.

The protective plate 51*g* is a plate-shaped member installed on the surface of the vibration plate 51*e* facing the Z1 direction, protects the plurality of drive elements 51*f*, and reinforces mechanical strength of the vibration plate 51*e*. Here, the plurality of drive elements 51*f* are accommodated between the protective plate 51*g* and the vibration plate 51*e*.

The case 51*h* is a member for storing the ink to be supplied to the plurality of pressure chambers C. For example, the case 51*h* is made of a resin material. The case 51*h* is provided with a space R2 for each of the nozzle row La and the nozzle row Lb. The space R2 is a space communicating with the above-described space R1, and functions as a reservoir R that stores the ink to be supplied to the plurality of pressure chambers C together with the space R1. The case 51*h* is provided with an inlet IH for supplying the ink to each reservoir R. The inlet IH is an example of a "second coupling flow path", is open in the Z1 direction, and is coupled to a branch flow path Pa2 described below, which is an example of a "first coupling flow path". The ink in each reservoir R is supplied to the pressure chamber C via each individual flow path Ra.

In the present embodiment, two inlets IH are provided for one reservoir R. One inlet IH of the two inlets IH is coupled to an end of the reservoir R in the Y1 direction, and the other inlet IH is coupled to an end of the reservoir R in the Y2 direction. As described above, one head chip 51 is provided with four inlets IH. The number of the inlets IH provided in one head chip 51 is not limited to four, and may be, for example, one or three or more for one reservoir R. In addition, the disposition of the inlet IH is not limited to the disposition in which the inlet IH is coupled to the end of the reservoir R in the Y1 direction or in the Y2 direction, and may be, for example, the disposition in which the inlet IH is coupled to the center of the reservoir R in the Y axis direction.

One inlet IH communicates with at least a portion of the plurality of nozzles N formed at the nozzle plate 51*c*. The nozzle plate 51*c* of the present embodiment has two nozzle rows La and Lb. Therefore, one inlet IH communicates with a portion of the plurality of nozzles N formed at the nozzle plate 51*c*, in other words, the plurality of nozzles N constituting the nozzle row La or the plurality of nozzles N constituting the nozzle row Lb. When the number of the nozzle rows formed at the nozzle plate 51*c* is one, the inlet IH may communicate with all the nozzles N formed at the nozzle plate 51*c*.

As will be described in detail below with reference to FIGS. 6 to 9, four flow path pipes 51*k* are provided on a surface of the case 51*h* facing the Z1 direction. For the respective inlets IH, the four flow path pipes 51*k* are provided to correspond to the four inlets IH. Each of the four flow path pipes 51*k* is a pipe body protruding in the Z1 direction, and the corresponding inlet IH is open to a tip surface of each flow path pipe 51*k*. Each flow path pipe 51*k* is liquid-tightly coupled to a flow path structure 52 described below. Thereby, the inlet IH and the branch flow path Pa2 described below are liquid-tightly coupled to each other. In the example illustrated in FIG. 2, the flow path pipe 51*k* is integrally configured with the case 51*h*, but the present disclosure is not limited to this, and the flow path pipe 51*k* may be configured separately from the case 51*h*. The constituent material of the flow path pipe 51*k* may be the same as or different from the constituent material of the case 51*h*.

The vibration absorbing body 51*d* is also called a compliance substrate, is a flexible resin film forming a wall surface of the reservoir R, and absorbs the pressure fluctuation in the ink in the reservoir R. The vibration absorbing body 51*d* may be a flexible thin plate made of metal. A surface of the vibration absorbing body 51*d* facing the Z1 direction is joined to the flow path substrate 51*a* by using an adhesive or the like. On the other hand, a frame body 56 is joined to a surface of the vibration absorbing body 51*d* facing the Z2 direction by using an adhesive or the like. The frame body 56 is a frame-shaped member along an outer periphery of the vibration absorbing body 51*d*, and is made of, for example, a metal material. As shown by a two-dot chain line in the drawing, a fixed plate 53, which will be described below, is joined to a surface of the frame body 56 facing the Z1 direction by using an adhesive or the like.

The wiring substrate 51*i* is mounted on the surface of the vibration plate 51*e* facing the Z1 direction, and is a mounting component for electrically coupling the head chip 51, a drive circuit 51*j*, and the control unit 20. The wiring substrate 51*i* is, for example, a flexible wiring substrate such as a chip on film (COF), a flexible printed circuit (FPC) or a flexible flat cable (FFC). The drive circuit 51*j* is mounted on the wiring substrate 51*i* of the present embodiment. The drive circuit 51*j* is a circuit including a switching element for switching, based on a control signal SI, whether or not to supply at least a portion of a waveform included in the drive signal Com to the drive element 51*f* as a drive pulse.

In the above-described head chip 51, the drive element 51*f* is driven by the drive signal Com, so that the pressure inside the pressure chamber C fluctuates, and the ink is ejected from the nozzle N in accordance with the fluctuation.

1-3. Liquid Ejecting Head

Figure 3:
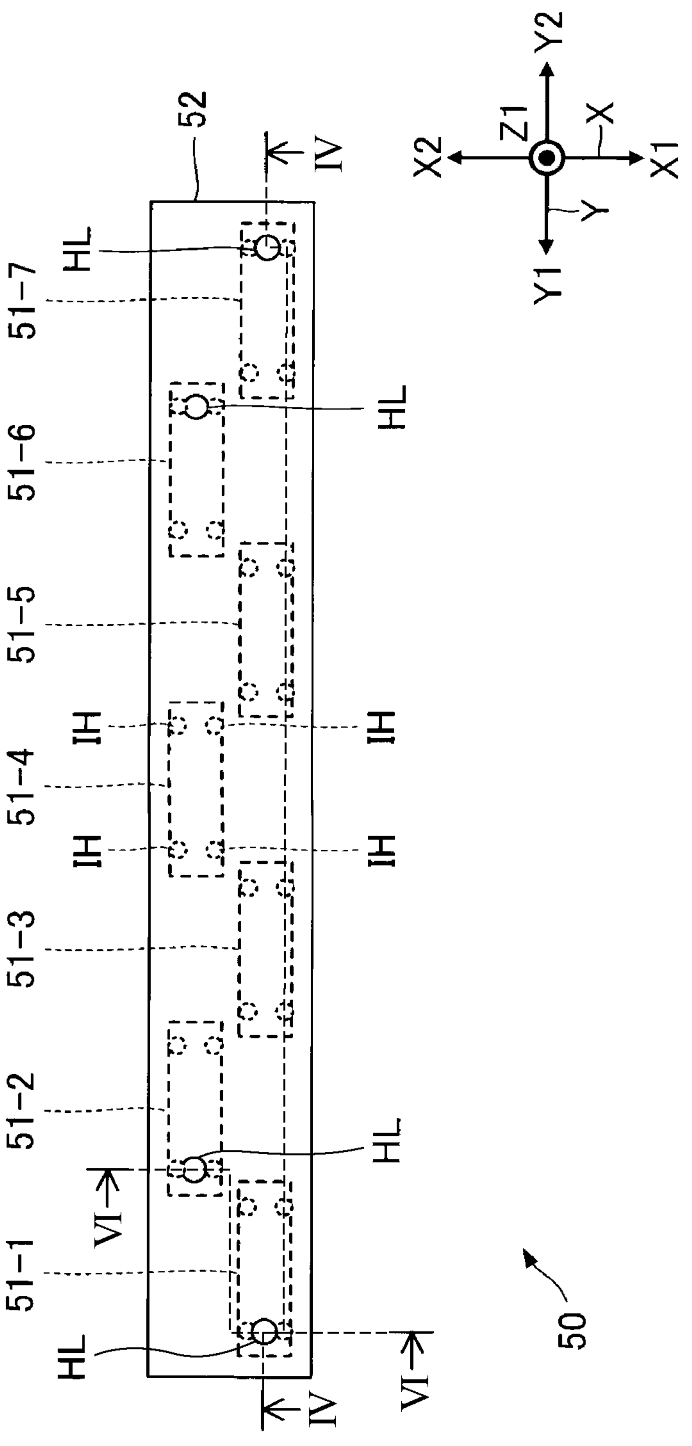
FIG. 3 is a top view of a liquid ejecting head according to the first embodiment.
Figure 4:
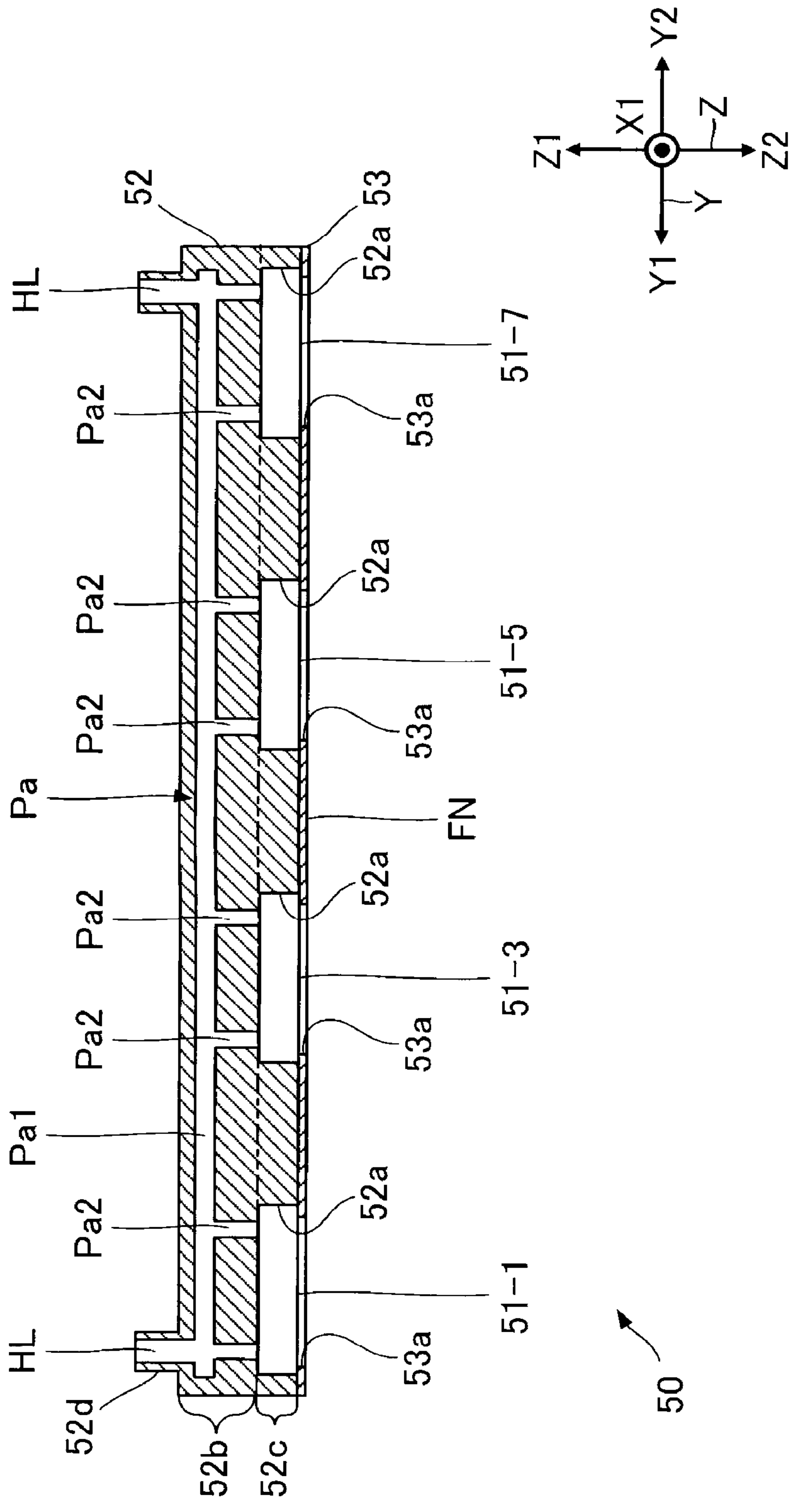
FIG. 4 is a cross-sectional view taken along the line IV-IV in FIG. 3.
Figure 5:
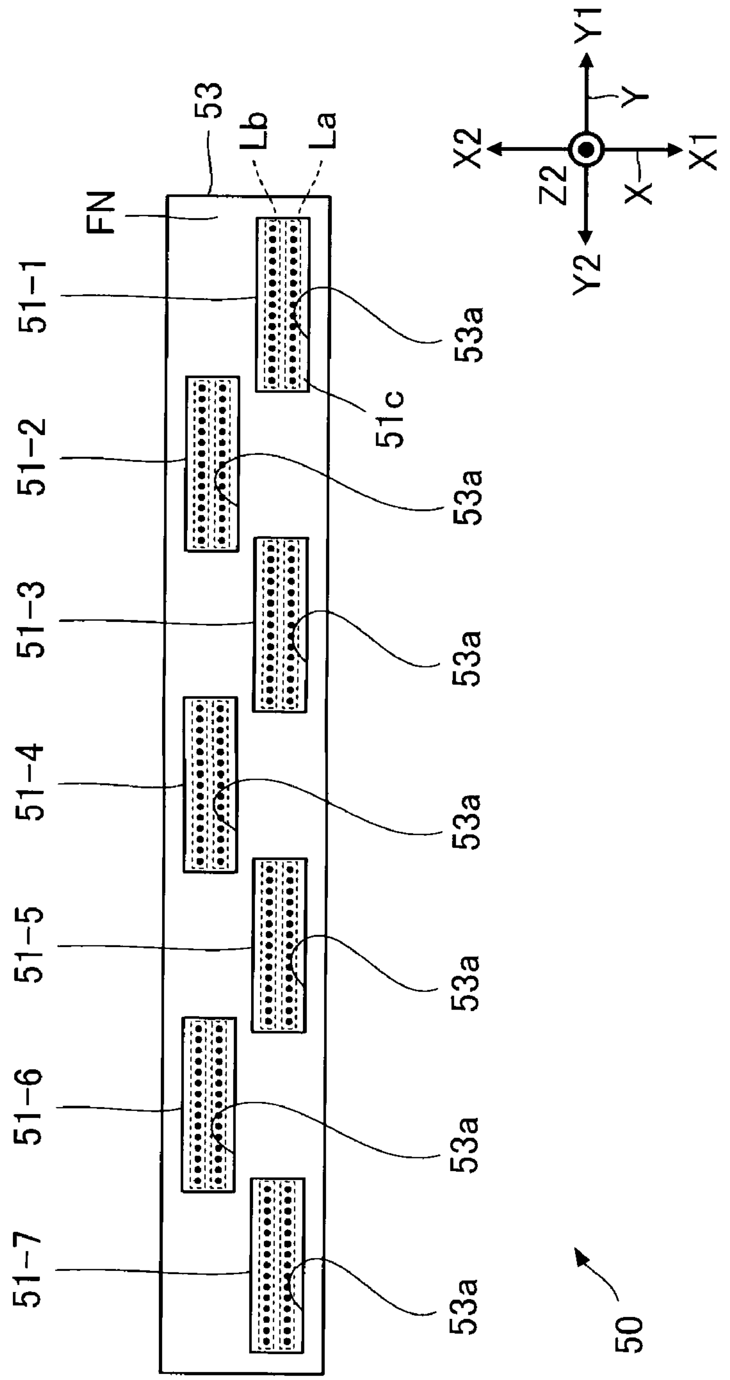
FIG. 5 is a bottom view of the liquid ejecting head according to the first embodiment.

FIG. 3 is a top view of the liquid ejecting head 50 according to the first embodiment. FIG. 4 is a cross-sectional view taken along the line IV-IV in FIG. 3. FIG. 5 is a bottom view of the liquid ejecting head 50 according to the first embodiment. FIGS. 3 to 5 schematically illustrate the liquid ejecting head 50 having head chips 51-1 to 51-7. Each of the head chips 51-1 to 51-7 is the head chip 51 described above. Hereinafter, each of the head chips 51-1 to 51-7 may be referred to as the head chip 51.

As illustrated in FIGS. 3 to 5, the liquid ejecting head 50 has the head chips 51-1 to 51-7, the flow path structure 52, and the fixed plate 53. The flow path structure 52 is an example of a "holder".

As illustrated in FIGS. 3 and 5, the head chips 51-1 to 51-7 are disposed in a staggered pattern when viewed in the direction along the Z axis. Here, the head chips 51-1 to 51-7 are arranged in this order in the Y2 direction. Note that the head chips 51-1, 51-3, 51-5, and 51-7 are disposed to be aligned with each other in the direction along the X axis. With respect to this, the head chips 51-2, 51-4, and 51-6 are disposed at positions in the X2 direction from the head chips 51-1, 51-3, 51-5, and 51-7 to be aligned with each other in the direction along the X axis. In addition, two head chips 51 closest to each other among the head chips 51-1 to 51-7 are disposed such that the nozzle rows La and Lb of one head chip 51 and the nozzle rows La and Lb of the other head chip 51 partially overlap when viewed in the direction along the X axis.

The flow path structure 52 is a structure in which is provided a flow path Pa for supplying the ink from the liquid container 10 to the head chips 51-1 to 51-7. The flow path structure 52 is made of, for example, a resin material or a metal material.

As illustrated in FIG. 4, the flow path Pa has a common flow path Pa1, a plurality of branch flow paths Pa2, and a plurality of openings HL.

The common flow path Pa1 is a flow path that is commonly provided in the plurality of head chips 51. In the present embodiment, the common flow path Pa1 is configured of a flow path commonly provided in the head chips 51-1, 51-3, 51-5, and 51-7 and a flow path commonly provided in the head chips 51-2, 51-4, and 51-6. Each of these flow paths extends in the direction along the Y axis, and both ends of each flow path communicate with the opening HL facing the Z1 direction. The ink from the liquid container 10 is introduced into the opening HL.

The plurality of branch flow paths Pa2 are respectively provided for the inlets IH of each of the head chips 51-1 to 51-7 and communicate with the common flow path Pa1. The flow path pipe 51*k* of the head chip 51 is inserted into each of the plurality of branch flow paths Pa2 of the present embodiment. Thereby, each of the plurality of branch flow paths Pa2 communicates with the corresponding inlet IH. Here, a sealing member 61, which will be described below, is interposed between an outer peripheral surface of the flow path pipe 51*k* and an inner peripheral surface of the branch flow path Pa2, and each of the plurality of branch flow paths Pa2 is liquid-tightly coupled to the corresponding inlet IH. In FIG. 4, the configuration related to this coupling is not illustrated for the sake of clarity. The configurations related to this coupling will be described below with reference to FIGS. 6 to 9.

The flow path structure 52 has a plurality of recesses 52*a* that accommodate the plurality of head chips 51. Each of the plurality of recesses 52*a* is a depression provided on a surface of the flow path structure 52 facing the Z2 direction. The head chip 51 accommodated in such a recess 52*a* overlaps the flow path structure 52 in the direction along the Z axis. The plurality of recesses 52*a* may be respectively provided for the head chips 51 or may be respectively provided for groups of two or more head chips 51. Therefore, the number of the recesses 52*a* does not need to be equal to the number of the head chips 51, the number is not limited to the plural, and may be the singular.

Here, the flow path structure 52 has a flow path forming portion 52*b*, a wall portion 52*c*, and a plurality of pipe portions 52*d*. The flow path Pa is provided in the flow path forming portion 52*b*. The wall portion 52*c* protrudes from the flow path forming portion 52*b* in the Z2 direction so as to form the plurality of recesses 52*a* using a surface of the flow path forming portion 52*b* facing the Z2 direction as a bottom surface. Each of the plurality of pipe portions 52*d* protrudes from the flow path forming portion 52*b* in the Z1 direction, and each pipe portion 52*d* is provided with the opening HL and is coupled with a pipe body (not illustrated) for transporting the ink from the liquid container 10.

The fixed plate 53 is a plate-shaped member for fixing the plurality of head chips 51 to the flow path structure 52. The fixed plate 53 has a plate-shaped flat plate portion 53*b*, and the flat plate portion 53*b* is provided with a plurality of exposure opening portions 53*a* for exposing the nozzle plate 51*c* of each head chip 51 to an outside of the liquid ejecting head 50. As illustrated in FIG. 2, the exposure opening portion 53*a* of the present embodiment exposes the entire portion of the nozzle plate 51*c* to the outside. In other words, an outer periphery of the nozzle plate 51*c* is disposed within a peripheral edge of the exposure opening portion 53*a* when viewed in the Z1 direction. Note that the exposure opening portion 53*a* may expose at least a portion of the nozzle plate 51*c* to the outside. In other words, when viewed in the Z1 direction, an outer peripheral portion of the nozzle plate 51*c* may be located outside the exposure opening portion 53*a*, that is, may overlap the flat plate portion 53*b*. The plurality of head chips 51 are accommodated in an accommodation space S defined by the flat plate portion 53*b*, the flow path forming portion 52*b* described above, and the wall portion 52*c*. It can be said that the accommodation space S is defined by the flat plate portion 53*b* and a wall surface of the recess 52*a*. That is, when viewed in the Z1 direction, the head chip 51 is surrounded by the wall portion 52*c* all around. In the example illustrated in FIGS. 4 and 5, the plurality of exposure opening portions 53*a* are individually provided for each head chip 51. The fixed plate 53 is made of, for example, a metal material such as stainless steel, titanium, and magnesium alloy.

A surface of the fixed plate 53 facing the Z2 direction constitutes a portion of the ejection surface FN together with a portion, which is exposed from the exposure opening portion 53*a*, on a surface of each head chip 51 facing the Z2 direction.

1-4. Coupling Structure Between Head Chip and Flow Path Structure

Figure 6:
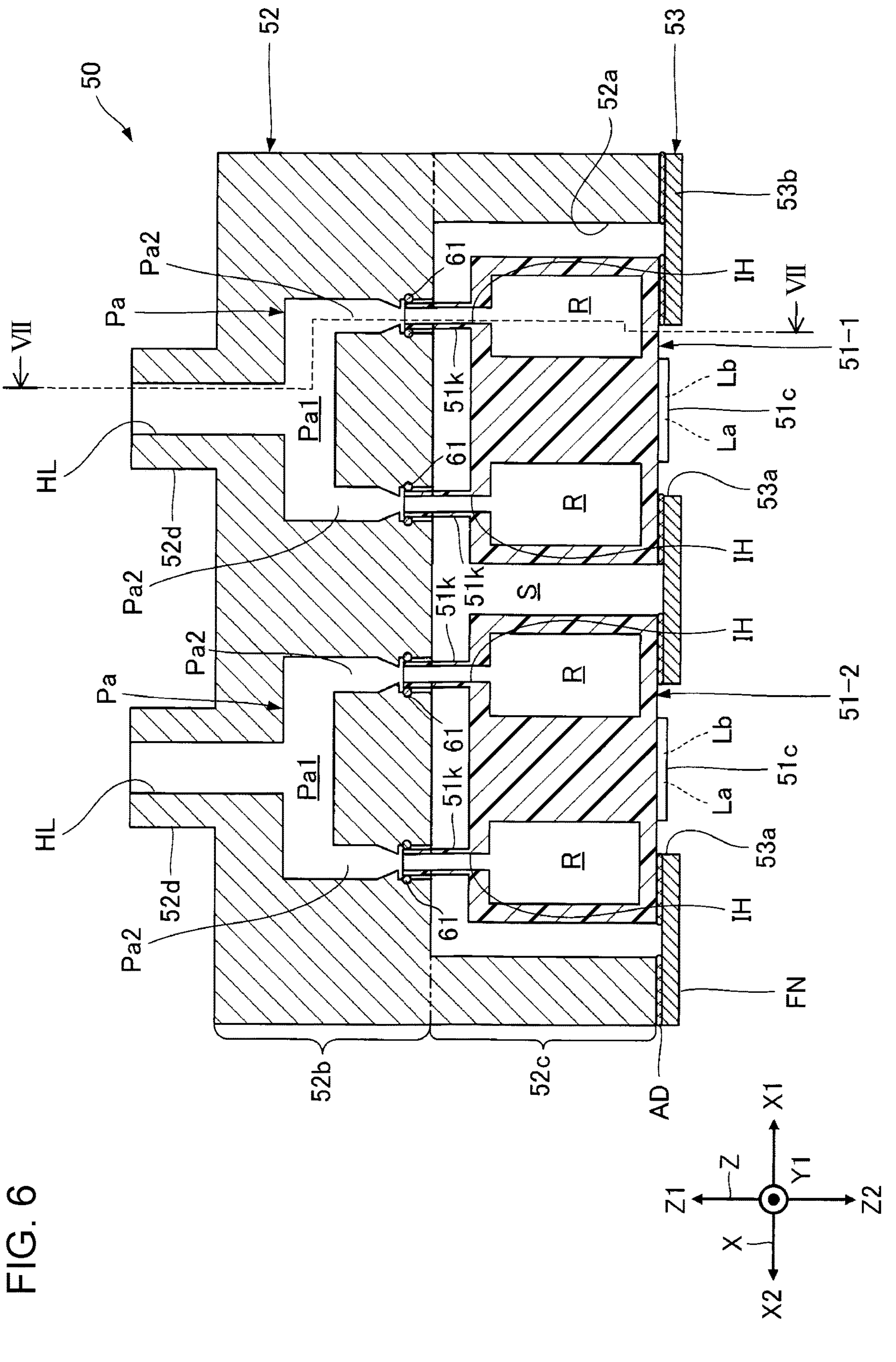
FIG. 6 is a cross-sectional view taken along the line VI-VI in FIG. 3.
Figure 7:
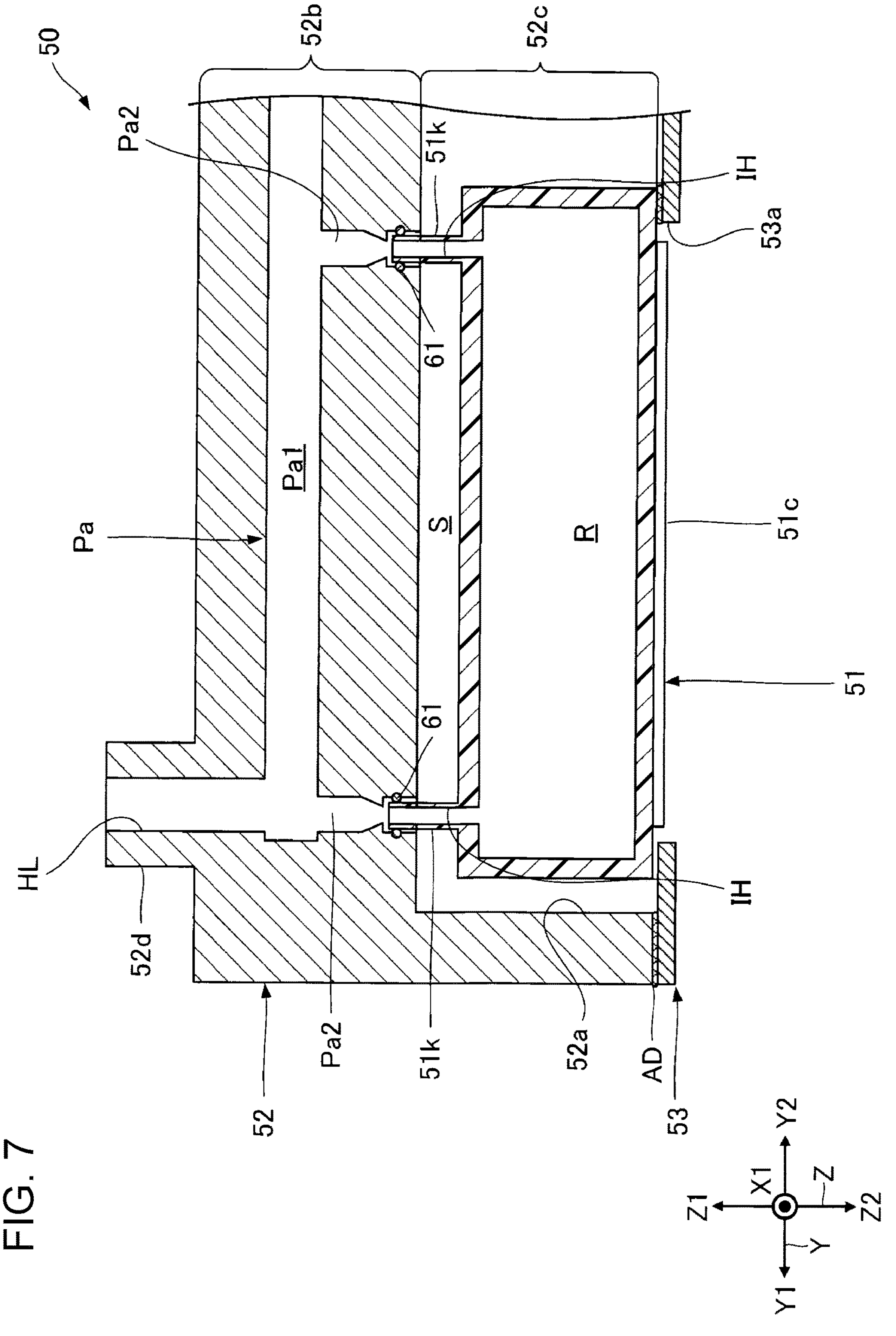
FIG. 7 is a cross-sectional view taken along the line VII-VII in FIG. 6.
Figure 8:
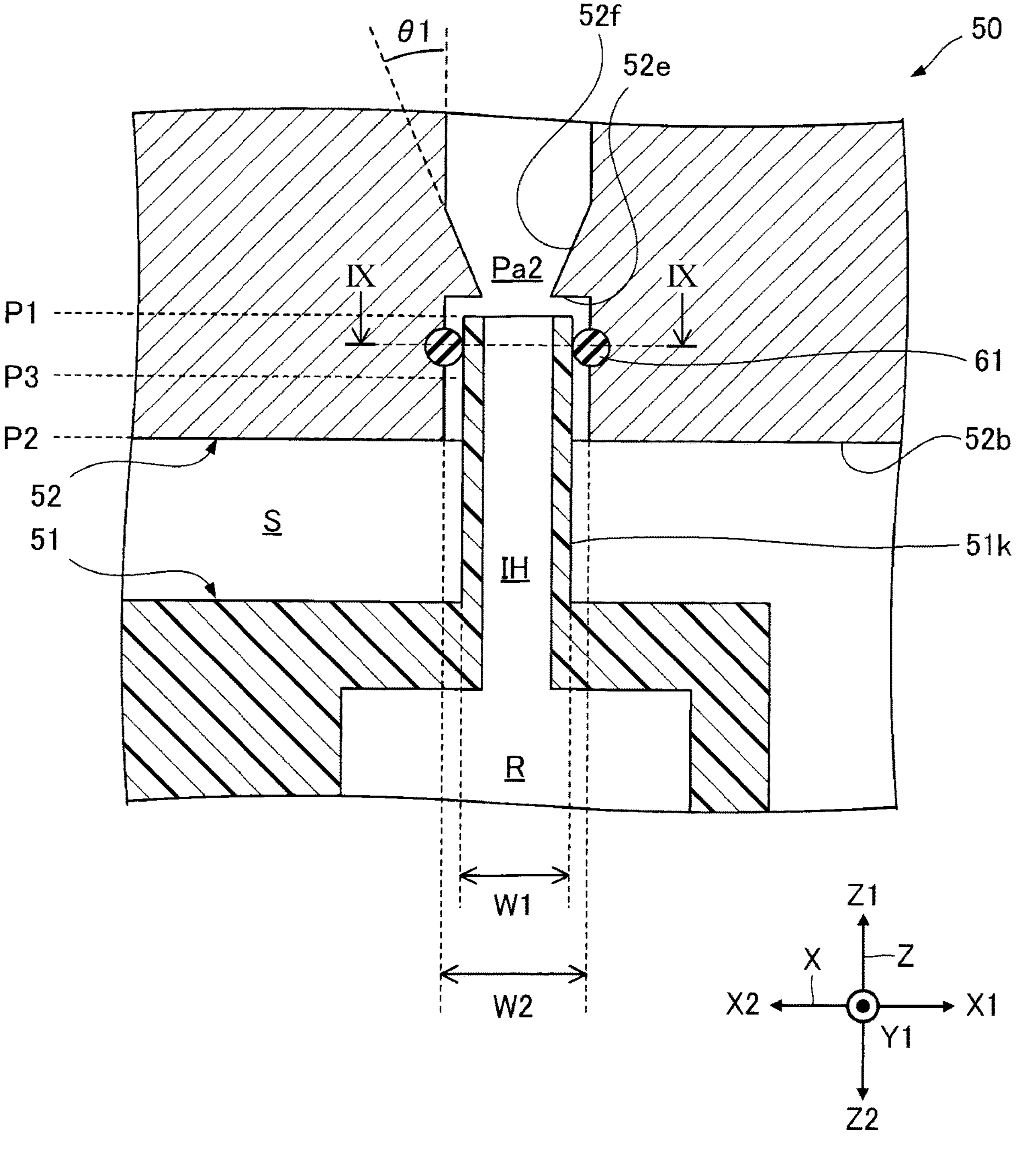
FIG. 8 is an enlarged cross-section for describing a coupling state between the head chip and a holder of the liquid ejecting head according to the first embodiment.
Figure 9:
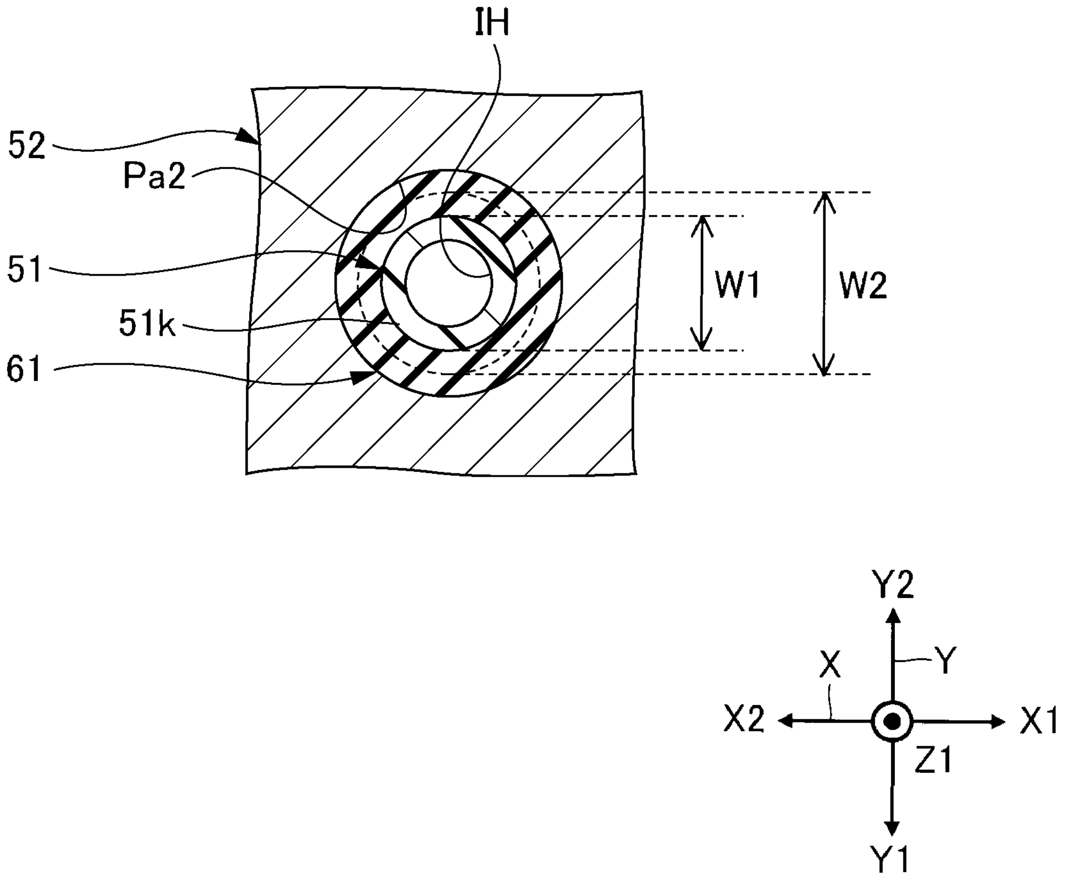
FIG. 9 is a cross-sectional view taken along the line IX-IX in FIG. 8.

FIG. 6 is a cross-sectional view taken along the line VI-VI in FIG. 3. FIG. 7 is a cross-sectional view taken along the line VII-VII in FIG. 6. FIG. 8 is an enlarged cross-section for describing a coupling state between the head chip 51 and the flow path structure 52 of the liquid ejecting head 50 according to the first embodiment. FIG. 9 is a cross-sectional view taken along the line IX-IX in FIG. 8. In FIGS. 6 and 7, for convenience of description, the internal structure of the head chip 51 is schematically illustrated.

As illustrated in FIGS. 6 and 7, using an adhesive AD, the plurality of head chips 51 are joined to a surface of the fixed plate 53 facing the Z1 direction in an aligned state, and an end surface of the wall portion 52*c* of the flow path structure 52 in the Z2 direction is joined thereto. The adhesive AD is not particularly limited, but is preferably a thermosetting adhesive such as an epoxy-based thermosetting adhesive from the viewpoint of having excellent both joint strength and liquid resistance.

As illustrated in FIGS. 6 to 9, each of the flow path pipes 51*k* of the head chip 51 is inserted into the branch flow path Pa2 of the flow path structure 52, and an annular sealing member 61 is interposed between the outer peripheral surface of the flow path pipe 51*k* and the inner peripheral surface of the branch flow path Pa2. Thereby, the inlet IH and the branch flow path Pa2 are liquid-tightly coupled to each other. The structure related to this coupling will be described below in detail.

Each of the plurality of flow path pipes 51*k* is a pipe body protruding in the Z1 direction, and the inlet IH is provided inside each of the flow path pipes 51*k*. The corresponding inlet IH is open to a tip surface of the flow path pipe 51*k*.

In the example illustrated in FIGS. 6 to 8, the flow path pipe 51*k* has a shape extending in the direction along the Z axis with a constant width W1. Thereby, even when a positional relationship between the head chip 51 and the flow path structure 52 in the direction along the Z axis changes slightly in combination with a portion of the branch flow path Pa2 extending with a constant width as will be described below, the fluctuation in a distance between the outer peripheral surface of the flow path pipe 51*k* and the inner peripheral surface of the branch flow path Pa2 can be reduced. As a result, even when the positional relationship between the head chip 51 and the flow path structure 52 in the direction along the Z axis changes slightly, the fluctuation in the liquid tightness due to the sealing member 61 can be reduced. In addition, the tip surface of the flow path pipe 51*k* is formed along a plane perpendicular to the Z axis. Accordingly, a gap between a stepped surface 52*e*, which will be described below, and the tip surface of the flow path pipe 51*k* can be made uniform.

The flow path pipe 51*k* is not limited to the shape having a constant width, and may have a plurality of portions having different widths or may have curved or bent portions, as long as the flow path pipe 51*k* can be inserted into the branch flow path Pa2.

In the example illustrated in FIG. 9, each of shapes of the outer peripheral surface and an inner peripheral surface of the flow path pipe 51*k* when viewed in the direction along the Z axis is circular. Thereby, the stable liquid tightness by the sealing member 61 can be obtained compared to an aspect in which the shape is a shape other than a circular shape. Here, since the shape of the outer peripheral surface of the flow path pipe 51*k* is similar to the shape of the inner peripheral surface of the branch flow path Pa2 or the sealing member 61 when viewed in the direction along the Z axis, such stable liquid tightness is easily obtained.

Each of the shapes of the outer peripheral surface and the inner peripheral surface of the flow path pipe 51*k* when viewed in the direction along the Z axis is not limited to a circular shape, and may be, for example, an elliptical shape, or a polygonal shape such as a quadrangular shape or a hexagonal shape.

On the other hand, each of the plurality of branch flow paths Pa2 is open to the surface of the flow path forming portion 52*b* facing the Z2 direction.

In the example illustrated in FIG. 8, the branch flow path Pa2 extends in the direction along the Z axis, and an inclined surface 52*f* and the stepped surface 52*e* are provided on the inner peripheral surface of the branch flow path Pa2. The inclined surface 52*f* is formed to reduce a cross-sectional area (that is, a cross-sectional area perpendicular to the Z axis) of the branch flow path Pa2 as it is directed in the Z2 direction. In addition, the stepped surface 52*e* is a surface perpendicular to the Z axis, and extends outward in a radial direction of the branch flow path Pa2 from an end of the inclined surface 52*f* in the Z2 direction. Here, the tip surface of the flow path pipe 51*k* faces the stepped surface 52*e*. By providing the inclined surface 52*f* and the stepped surface 52*e* as described above, it is possible to reduce a pressure loss of the ink flowing between the branch flow path Pa 2 and the inlet IH, or to reduce the retention of bubbles, components of the ink, or foreign matters in a coupling portion between the branch flow path Pa2 and the inlet IH. An inclination angle θ1 of the inclined surface 52*f* with respect to a central axis of the branch flow path Pa2 is not particularly limited, but from the viewpoint of suitably obtaining the reduction of the pressure loss and the reduction of the retention, the inclination angle θ1 is, for example, in a range of 8° or more and 50° or less, and preferably in a range of 20° or more and 45° or less. A shape of the inclined surface 52*f* is not limited to the illustrated example, and may be, for example, a curved shape when viewed in a cross section including the central axis of the branch flow path Pa2.

Here, a portion of the branch flow path Pa2 in the Z2 direction from the stepped surface 52*e* extends in the direction along the Z axis with a constant width W2. Thereby, even when a positional relationship between the head chip 51 and the flow path structure 52 in the direction along the Z axis changes slightly in combination with the flow path pipe 51*k* with a constant width as described above, the fluctuation in a distance between the outer peripheral surface of the flow path pipe 51*k* and the inner peripheral surface of the branch flow path Pa2 can be reduced. As a result, even when the positional relationship between the head chip 51 and the flow path structure 52 in the direction along the Z axis changes slightly, the fluctuation in the liquid tightness due to the sealing member 61 can be reduced. Here, a gap is formed between a tip of the flow path pipe 51*k* and the stepped surface 52*e*. Thereby, a slight change in the positional relationship between the head chip 51 and the flow path structure 52 in the direction along the Z axis is allowed.

The inclined surface 52*f* and the stepped surface 52*e* may be provided as necessary and may be omitted. In addition, the branch flow path Pa2 is not limited to the above-described shape, and may have, for example, a curved or bent portion.

The width W2 of the branch flow path Pa2 is larger than the width W1 of the flow path pipe 51*k*. The width W1 is a width of the flow path pipe 51*k* in any one direction perpendicular to the Z axis. In addition, the width W2 is a width of the opening of the branch flow path Pa2 in the one direction. A difference between the width W1 and the width W2 is determined depending on the shape, size, or constituent material of the sealing member 61, is not particularly limited, and is set in any desired way.

In the example illustrated in FIG. 9, the shape of the inner peripheral surface of the branch flow path Pa2 when viewed in the direction along the Z axis is circular. That is, the shape is similar to the shape of the outer peripheral surface of the flow path pipe 51*k*. Therefore, even when the sealing member 61 is an O-ring-shaped member, the stable liquid tightness by the sealing member 61 can be obtained.

The shape of the inner peripheral surface of the branch flow path Pa2 when viewed in the direction along the Z axis is not limited to a circular shape, and may be, for example, an elliptical shape, or a polygonal shape such as a quadrangular shape or a hexagonal shape. In addition, when viewed in the direction along the Z axis, the shape of the inner peripheral surface of the branch flow path Pa2 may be different from the shape of the outer peripheral surface of the flow path pipe 51*k*.

The flow path pipe 51*k* is inserted into the branch flow path Pa2 described above. Here, in order to make liquid-tight communication between the branch flow path Pa2 and the inlet IH, when the head chip 51 and the flow path structure 52 are liquid-tightly coupled to each other by using an adhesive, it is difficult to separate the head chip 51 and the flow path structure 52. As a result, it is difficult to regenerate the liquid ejecting head 50 by replacing the head chip 51 or to reuse the head chip 51 as a portion of another liquid ejecting head 50.

Under such circumstances, in order to make liquid-tight communication between the branch flow path Pa2 and the inlet IH, it is also conceivable that an elastic sealing member may be disposed in an elastically deformed state between the head chip 51 and the flow path structure 52 so as to be interposed in the Z1 direction or the Z2 direction in which the head chip 51 and the flow path structure 52 overlap, without using an adhesive. For example, it is conceivable to dispose an elastic sealing member between the above-described stepped surface 52*e* and the tip surface of the flow path pipe 51*k*.

However, in this case, since the sealing member is in an elastically deformed state by being compressed in the direction along the Z axis, a direction of reaction force due to the elastic deformation is the direction along the Z axis. When such reaction force acts on the head chip 51, the fixed plate 53 is deformed in the direction along the Z axis. Such deformation of the fixed plate 53 causes a decrease in the alignment accuracy of the head chip 51 fixed on the fixed plate 53 as described above.

Here, since the flat plate portion 53*b* of the fixed plate 53 has a relatively thin plate shape, the axial rigidity of the flat plate portion 53*b* in the direction perpendicular to the direction along the Z axis is greater than the shear rigidity of the flat plate portion 53*b* in the direction along the Z axis. Therefore, the flat plate portion 53*b* is easily deformed by the reaction force in the direction along the Z axis as described above, but it can be said that the flat plate portion 53*b* is difficult to deform in the direction perpendicular to the Z axis.

Therefore, the sealing member 61 is not interposed between the flow path structure 52 and the flow path pipe 51*k* in the direction along the Z axis, but is disposed between the outer peripheral surface of the flow path pipe 51*k* and the inner peripheral surface of the branch flow path Pa2 when viewed in the direction along the Z axis. Here, each of the outer peripheral surface and the inner peripheral surface is a surface along the Z axis. Therefore, even when the sealing member 61 is elastically deformed in a state where the sealing member 61 is disposed between the outer peripheral surface of the flow path pipe 51*k* and the inner peripheral surface of the branch flow path Pa2, the direction of the reaction force due to the elastic deformation is mainly the direction perpendicular to the Z axis. Accordingly, by disposing the sealing member 61 between the outer peripheral surface of the flow path pipe 51*k* and the inner peripheral surface of the branch flow path Pa2, it is possible to reduce the deformation of the fixed plate 53 due to the reaction force as described above.

The sealing member 61 is an annular elastic member disposed between the outer peripheral surface of the flow path pipe 51*k* and the inner peripheral surface of the branch flow path Pa2. The term "elastic" refers to a property of being elastically deformable. The sealing member 61 is made of, for example, an elastic material such as an elastomer. Examples of the elastomer include a thermosetting elastomer and a thermoplastic elastomer. Examples of the thermosetting elastomer include vulcanized rubber and a thermosetting resin-based elastomer such as silicone rubber or fluororubber. The sealing member 61 is disposed in an elastically deformed state by being interposed between the outer peripheral surface of the flow path pipe 51*k* and the inner peripheral surface of the branch flow path Pa2. Thereby, the flow path pipe 51*k* and the flow path structure 52 are liquid-tightly coupled to each other via the sealing member 61.

In the example illustrated in FIGS. 6 to 9, the sealing member 61 is an O-ring-shaped member, and is integrally formed with the flow path structure 52 by insert molding or the like. Thereby, even when the flow path pipe 51*k* is inserted into or removed from the branch flow path Pa2, the sealing member 61 can be fixed at a desired position in the branch flow path Pa2. The sealing member 61 may be fixed to the flow path pipe 51*k*, as described in Modification Example 1 below. In addition, the shape of the sealing member 61 when viewed in the direction along the Z axis may be any shape as long as the flow path pipe 51*k* and the flow path structure 52 can be liquid-tightly coupled to each other, and is not limited to the illustrated example, and is set in any desired way.

In addition, as illustrated in FIG. 8, the sealing member 61 is disposed at a position in the Z1 direction from a center position P3 between the opening of the branch flow path Pa2 and the tip of the flow path pipe 51*k*. The center position P3 is a midpoint between a position P1 of the tip of the flow path pipe 51*k* in the direction along the Z axis and a position P2 of the opening of the branch flow path Pa2 in the direction along the Z axis. The sealing member 61 is located between the position P1 and the center position P3. The disposition of the sealing member 61 is not particularly limited as long as the flow path pipe 51*k* and the flow path structure 52 can be liquid-tightly coupled to each other.

An inner diameter of the sealing member 61 in a natural state in which the flow path pipe 51*k* is removed from the flow path structure 52 is smaller than the width W2 of the outer peripheral surface of the flow path pipe 51*k*. Thereby, the flow path pipe 51*k* and the flow path structure 52 can be liquid-tightly coupled to each other by the elastic deformation of the sealing member 61. The inner diameter is set such that a load applied to the sealing member 61 in a circumferential direction of the flow path pipe 51*k* due to this elastic deformation is smaller than fixing force of the fixed plate 53 to the head chip 51 in the direction perpendicular to the Z axis. As a result, the head chip 51 is prevented from coming off from the fixed plate 53 due to the reaction force due to the elastic deformation of the sealing member 61.

As described above, the above-described liquid ejecting head 50 includes the plurality of head chips 51, the fixed plate 53, and the flow path structure 52 which is an example of a "holder". Each of the plurality of head chips 51 has the nozzle plate 51*c*. The nozzle plate 51*c* is provided with the plurality of nozzles N that eject an ink, which is an example of a "liquid", in the Z2 direction, which is an example of a "first direction". The fixed plate 53 has the flat plate portion 53*b*. The flat plate portion 53*b* is provided with the plurality of exposure opening portions 53*a* for exposing, to the outside, at least a portion of each of the plurality of nozzle plates 51*c*, and has the plurality of head chips 51 fixed thereto. The flow path structure 52 has the flow path forming portion 52*b* and the wall portion 52*c*. The flow path forming portion 52*b* is provided with the "plurality of branch flow paths Pa2", which is an example of the "plurality of first coupling flow paths" that is open in the Z2 direction. The wall portion 52*c* protrudes from the flow path forming portion 52*b* in the Z2 direction and is fixed to the flat plate portion 53*b*.

Here, the plurality of head chips 51 are accommodated in the accommodation space S defined by the flat plate portion 53*b*, the flow path forming portion 52*b*, and the wall portion 52*c*. The head chip 51 has the flow path pipe 51*k* protruding in the Z1 direction, which is an example of the "second direction" opposite to the Z2 direction. Inside the flow path pipe 51*k*, the inlet IH, which is an example of the "second coupling flow path", is provided. In a state where the flow path pipe 51*k* is inserted into the branch flow path Pa2, the branch flow path Pa2 communicates with the inlet IH in a liquid-tight manner via the elastic sealing member 61 disposed between the inner peripheral surface of the branch flow path Pa2 and the outer peripheral surface of the flow path pipe 51*k* when viewed in the Z1 direction.

In the liquid ejecting head 50 described above, since the branch flow path Pa2 communicates with the inlet IH in a liquid-tight manner via the elastic sealing member 61, there is no need to adhere the head chip 51 and the flow path structure 52 to each other in order to couple these flow paths. Therefore, the head chip 51 can be detachably attached to the flow path structure 52. Accordingly, the head chip 51 can be suitably replaced.

Moreover, since the elastic sealing member 61 is disposed between the inner peripheral surface of the branch flow path Pa2 and the outer peripheral surface of the flow path pipe 51*k* when viewed in the Z2 direction, it is possible to reduce the reaction force due to the elastic deformation during sealing of the sealing member 61, which is applied to the fixed plate 53 in the Z2 direction via the head chip 51, compared to an aspect in which the sealing member interposed between the head chip 51 and the flow path structure 52 in the Z2 direction is used. Therefore, the deformation of the fixed plate 53 can be reduced.

Here, when the flow path pipe 51*k* is inserted into the branch flow path Pa2 after the fixed plate 53 and the head chip 51 are adhered to each other, the reaction force due to the elastic deformation during sealing of the sealing member 61 may be applied to the fixed plate 53 in the direction intersecting the Z2 direction via the head chip 51. However, since the axial rigidity of the fixed plate 53 is higher than the shear rigidity, even when such reaction force is applied to the fixed plate 53, the fixed plate 53 is difficult to deform. As described above, the head chip 51 can be replaced while reducing the deformation of the fixed plate 53.

In the present embodiment, as described above, the sealing member 61 is disposed at a position in the Z1 direction from the center position P3 between the opening of the branch flow path Pa2 and the tip of the flow path pipe 51*k*. Therefore, a portion of a gap between the inner peripheral surface of the branch flow path Pa2 and the outer peripheral surface of the flow path pipe 51*k* that communicates with the flow path can be reduced. As a result, it is possible to suppress the retention of bubbles and the sedimentation of components of the liquid in the flow path.

In addition, as described above, the sealing member 61 is not interposed between the flow path structure 52 and the flow path pipe 51*k* in the Z2 direction. Accordingly, it is possible to reduce the reaction force due to the elastic deformation during sealing of the sealing member 61, which is applied to the fixed plate 53 in the Z2 direction via the head chip 51.

Furthermore, as described above, the load applied to the sealing member 61 in the circumferential direction of the flow path pipe 51*k* is smaller than the fixing force of the fixed plate 53 to the head chip 51 in the direction perpendicular to the Z2 direction. Accordingly, the head chip 51 is prevented from being separated from the fixed plate 53.

2. Second Embodiment

Hereinafter, a second embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 10:
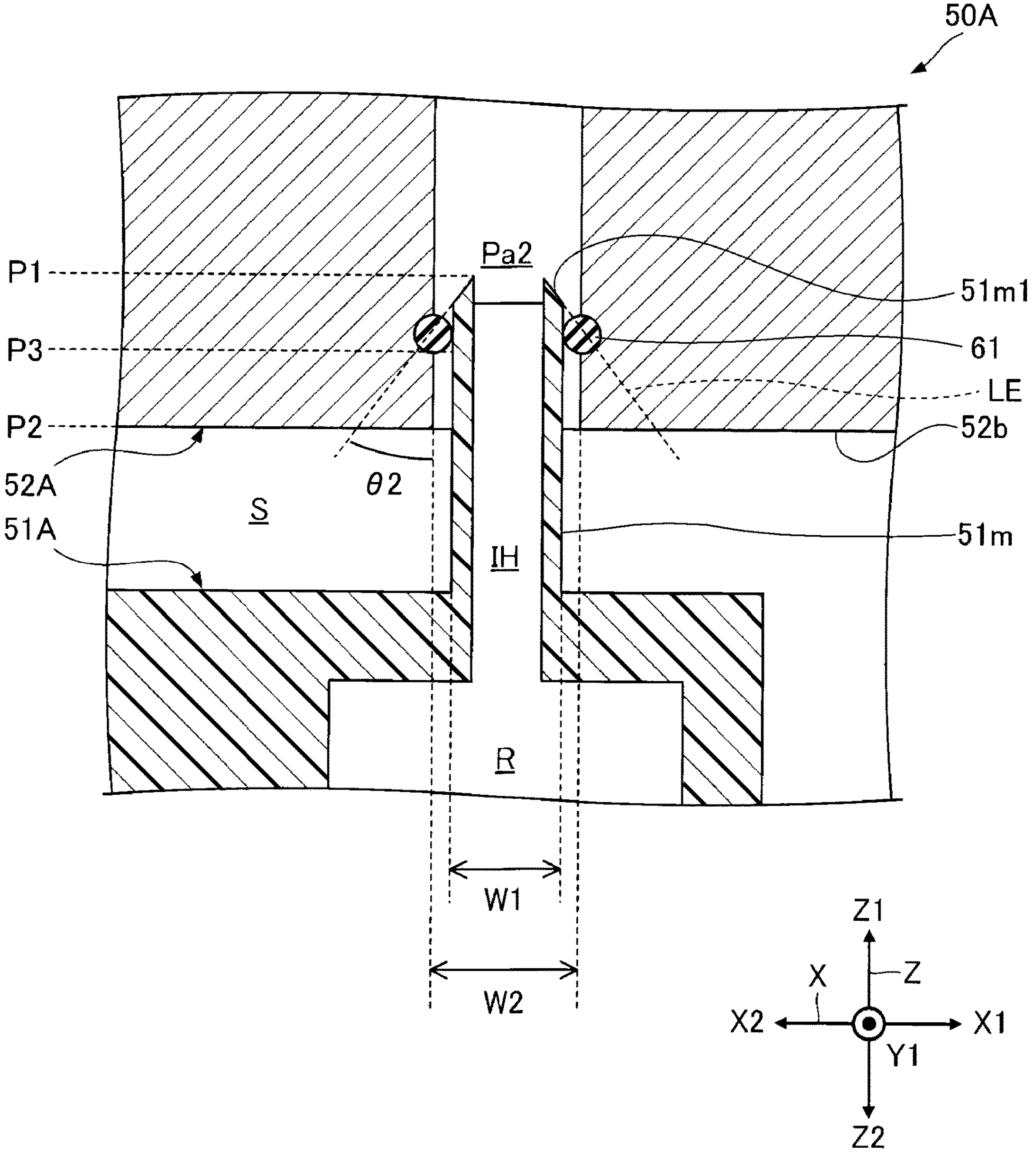
FIG. 10 is an enlarged cross-section for describing a coupling state between a head chip and a holder of a liquid ejecting head according to a second embodiment.

FIG. 10 is an enlarged cross-section for describing a coupling state between a head chip 51A and a flow path structure 52A of a liquid ejecting head 50A according to a second embodiment. The liquid ejecting head 50A has the same configuration as the liquid ejecting head 50 of the first embodiment except that the liquid ejecting head 50A has the head chip 51A instead of the head chip 51 and has the flow path structure 52A instead of the flow path structure 52. The flow path structure 52A is an example of a "holder".

The head chip 51A has the same configuration as the head chip 51 of the first embodiment except that the head chip 51A has a flow path pipe 51*m* instead of the flow path pipe 51*k*. The flow path pipe 51*m* has the same configuration as the flow path pipe 51*k* of the first embodiment except that the flow path pipe 51*m* has a tapered surface 51*m*1.

The tapered surface 51*m*1 is provided on the outer peripheral surface of the flow path pipe 51*m* to reduce a cross-sectional area of the flow path pipe 51*m* perpendicular to the Z2 direction toward a tip. An inclination angle θ2 of the tapered surface 51*m*1 with respect to the Z axis is not particularly limited, but from the viewpoint of facilitating the insertion and removal of the flow path pipe 51*m* with respect to the branch flow path Pa2, the inclination angle θ2 is, for example, in a range of 8° or more and 50° or less, and preferably in a range of 20° or more and 45° or less. A shape of the tapered surface 51*m*1 is not limited to the illustrated example, and may be, for example, a curved shape when viewed in a cross section including the central axis of the flow path pipe 51*m*.

The flow path structure 52A has the same configuration as the flow path structure 52 of the first embodiment except that the inclined surface 52*f* and the stepped surface 52*e* are omitted. The flow path structure 52A may have the inclined surface 52*f* and the stepped surface 52*e*, as with the flow path structure 52 of the first embodiment.

The flow path pipe 51*m* is inserted into the branch flow path Pa2 of the flow path structure 52A described above. Here, the sealing member 61 is disposed between the outer peripheral surface of the flow path pipe 51*m* and the inner peripheral surface of the branch flow path Pa2 when viewed in the direction along the Z axis. Thereby, the branch flow path Pa2 communicates with the inlet IH in a liquid-tight manner.

Here, as in the first embodiment, the sealing member 61 is formed at the inner peripheral surface of the branch flow path Pa2 to be integrated with the branch flow path Pa2, and is disposed on an extension line LE of the tapered surface 51*m*1 when viewed in the direction orthogonal to the direction along the Z axis.

According to the above second embodiment as well, the liquid ejecting head 50A can be regenerated or the head chip 51A can be reused while preventing the misalignment of the head chip 51A. In the present embodiment, as described above, the sealing member 61 is formed at the inner peripheral surface of the branch flow path Pa2 to be integrated with the branch flow path Pa2. In addition, the outer peripheral surface of the flow path pipe 51*m* has the tapered surface 51*m*1 to reduce the cross-sectional area of the flow path pipe 51*m* perpendicular to the Z2 direction toward the tip. Therefore, the insertability of the flow path pipe 51*m* into the branch flow path Pa2 can be improved compared to the aspect in which the flow path pipe 51*k* with a constant width is used as in the first embodiment. In addition, since the sealing member 61 is formed at the inner peripheral surface of the branch flow path Pa2 to be integrated with the branch flow path Pa2, the sealing member 61 can be stably disposed at a desired position in the branch flow path Pa2.

As described above, the sealing member 61 of the present embodiment is disposed on the extension line of the tapered surface 51*m*1 when viewed in the direction orthogonal to the Z2 direction. Therefore, a portion of a gap between the inner peripheral surface of the branch flow path Pa2 and the outer peripheral surface of the flow path pipe 51*m* that communicates with the flow path can be reduced. As a result, it is possible to suppress the retention of bubbles and the sedimentation of components of the liquid in the flow path.

When the flow path pipe 51*m* has the tapered surface 51*m*1 as in the present embodiment, it is preferable that elastic force of the sealing member 61 is prevented from acting on the tapered surface 51*m*1 by preventing the sealing member 61 from contacting the tapered surface 51*m*1.

3. Third Embodiment

Hereinafter, a third embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 11:
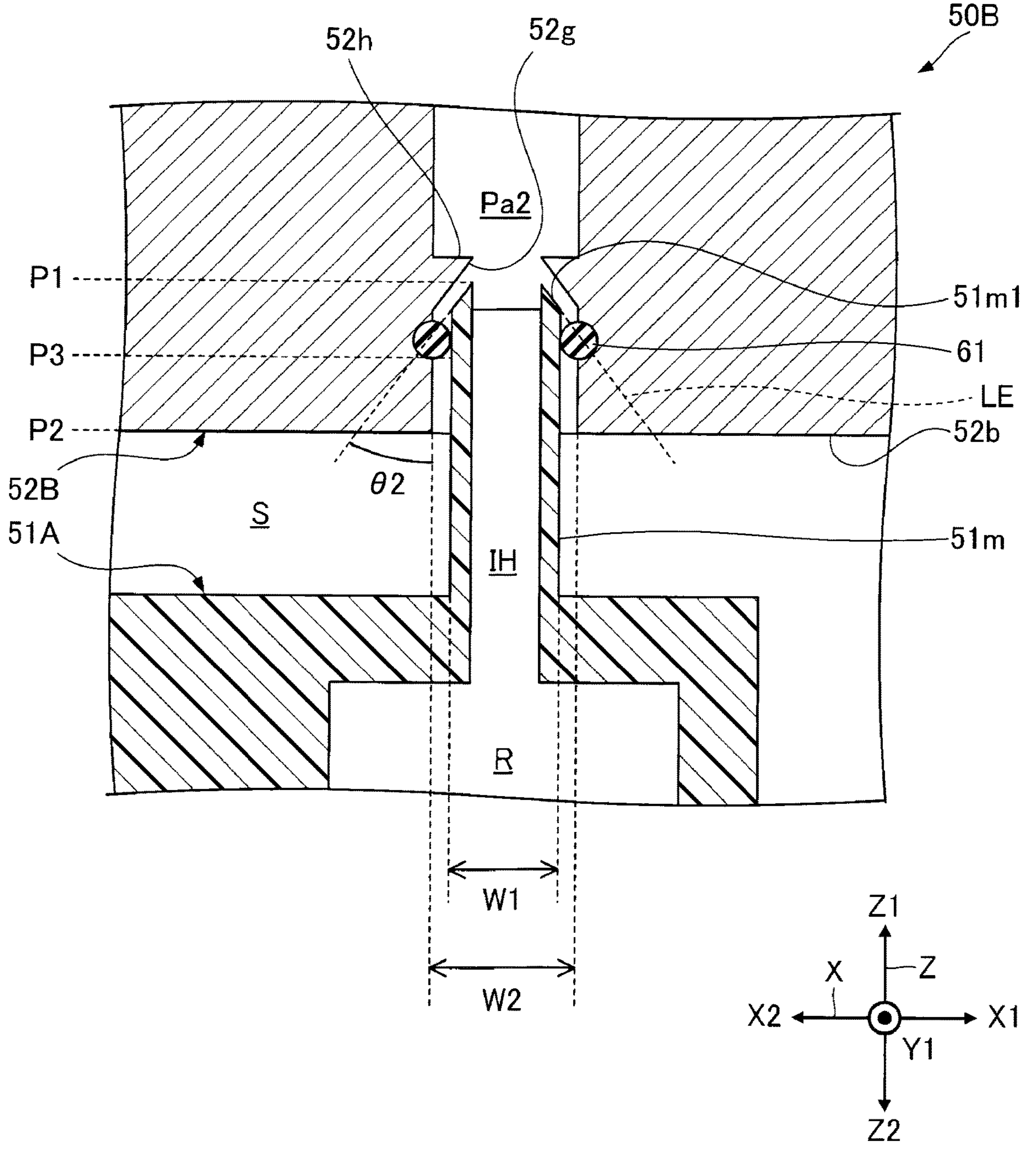
FIG. 11 is an enlarged cross-section for describing a coupling state between a head chip and a holder of a liquid ejecting head according to a third embodiment.

FIG. 11 is an enlarged cross-section for describing a coupling state between a head chip 51A and a flow path structure 52B of a liquid ejecting head 50B according to a third embodiment. The liquid ejecting head 50B has the same configuration as the liquid ejecting head 50 of the first embodiment except that the liquid ejecting head 50B has the head chip 51A instead of the head chip 51 and has the flow path structure 52B instead of the flow path structure 52. The flow path structure 52B is an example of a "holder". The head chip 51A has the same configuration as the head chip 51A of the second embodiment.

The flow path structure 52B has the same configuration as the flow path structure 52 of the first embodiment except that the flow path structure 52B has an inclined surface 52*g* and a stepped surface 52*h* instead of the inclined surface 52*f* and the stepped surface 52*e*.

The inclined surface 52*g* and the stepped surface 52*h* are provided on the inner peripheral surface of the branch flow path Pa2. The inclined surface 52*g* is formed to reduce a cross-sectional area (that is, a cross-sectional area perpendicular to the Z axis) of the branch flow path Pa2 as it is directed in the Z1 direction. In addition, the stepped surface 52*h* is a surface perpendicular to the Z axis, and extends outward in a radial direction of the branch flow path Pa2 from an end of the inclined surface 52*g* in the Z1 direction. Here, the inclined surface 52*g* has a shape along the tapered surface 51*m*1 of the flow path pipe 51*m*, and the tapered surface 51*m*1 faces the inclined surface 52*g*. By providing such an inclined surface 52*g*, it is possible to reduce a gap between the tapered surface 51*m*1 and the inner peripheral surface of the branch flow path Pa2.

The flow path pipe 51*m* is inserted into the branch flow path Pa2 of the flow path structure 52B described above. Here, the sealing member 61 is disposed between the outer peripheral surface of the flow path pipe 51*m* and the inner peripheral surface of the branch flow path Pa2 when viewed in the direction along the Z axis. Thereby, the branch flow path Pa2 communicates with the inlet IH in a liquid-tight manner. Here, as in the second embodiment, the sealing member 61 is disposed on an extension line LE of the tapered surface 51*m*1 when viewed in the direction orthogonal to the direction along the Z axis.

According to the above third embodiment as well, the liquid ejecting head 50B can be regenerated or the head chip 51A can be reused while preventing the misalignment of the head chip 51A. In the present embodiment, as described above, the flow path structure 52B has the inclined surface 52*g* facing the tapered surface 51*m*1 and formed along the tapered surface 51*m*1 in the branch flow path Pa2. Therefore, a portion of a gap between the inner peripheral surface of the branch flow path Pa2 and the outer peripheral surface of the flow path pipe 51*m* that communicates with the flow path can be reduced. As a result, it is possible to suppress the retention of bubbles and the sedimentation of components of the liquid in the flow path.

4. Fourth Embodiment

Hereinafter, a fourth embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 12:
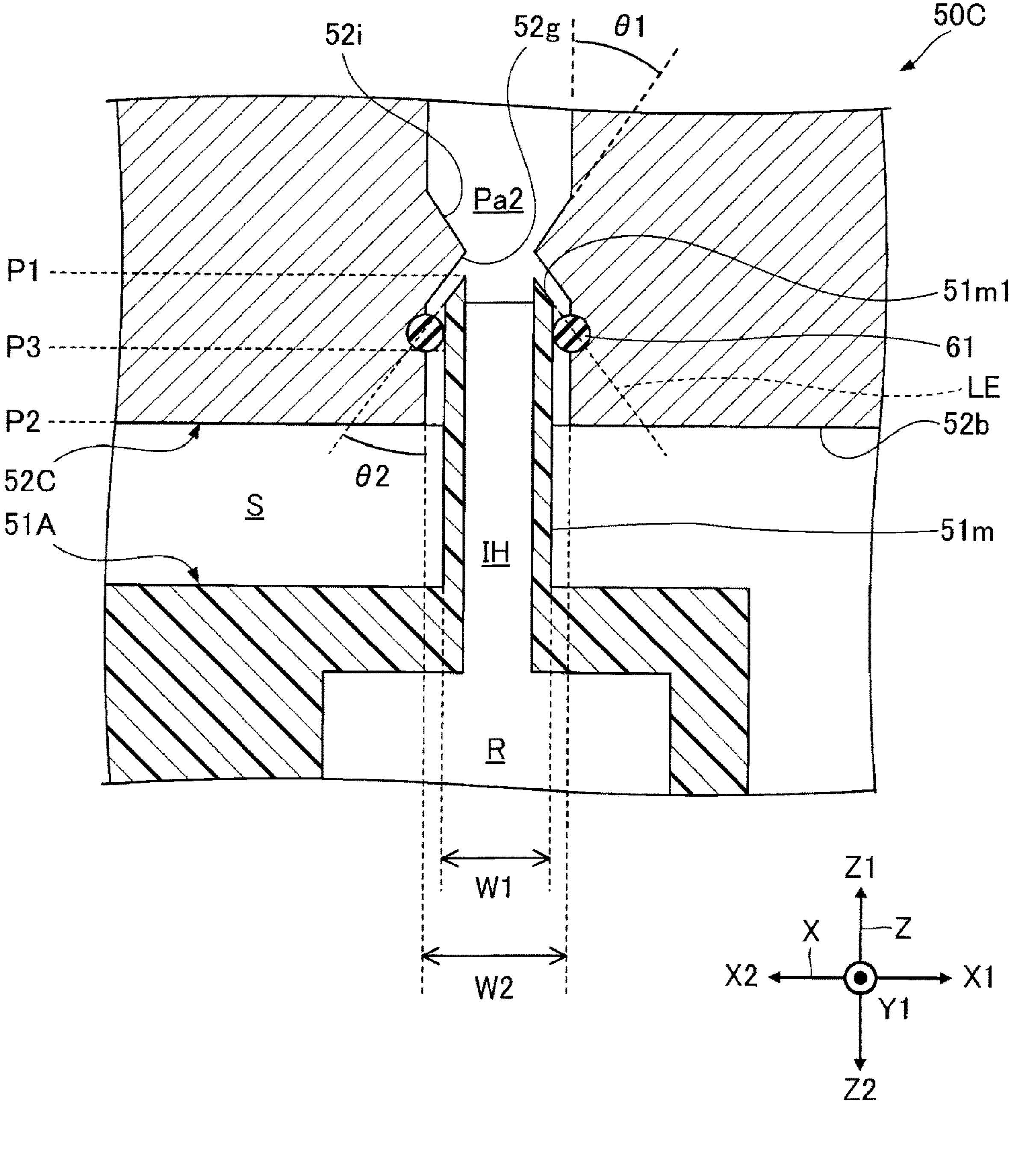
FIG. 12 is an enlarged cross-section for describing a coupling state between a head chip and a holder of a liquid ejecting head according to a fourth embodiment.

FIG. 12 is an enlarged cross-section for describing a coupling state between a head chip 51A and a flow path structure 52C of a liquid ejecting head 50C according to a fourth embodiment. The liquid ejecting head 50C has the same configuration as the liquid ejecting head 50 of the first embodiment except that the liquid ejecting head 50C has the head chip 51A instead of the head chip 51 and has the flow path structure 52C instead of the flow path structure 52. The flow path structure 52C is an example of a "holder". The head chip 51A has the same configuration as the head chip 51A of the second embodiment.

The flow path structure 52C has the same configuration as the flow path structure 52B of the third embodiment except that the flow path structure 52C has an inclined surface 52*i* instead of the stepped surface 52*h*.

The inclined surface 52*i* is provided on the inner peripheral surface of the branch flow path Pa2, and is formed to reduce a cross-sectional area (that is, a cross-sectional area perpendicular to the Z axis) of the branch flow path Pa2 as it is directed in the Z1 direction from the end of the inclined surface 52*g* in the Z1 direction. By providing such an inclined surface 52*i*, it is possible to reduce the pressure loss between the branch flow path Pa2 and the inlet IH.

The flow path pipe 51*m* is inserted into the branch flow path Pa2 of the flow path structure 52C described above. Here, the sealing member 61 is disposed between the outer peripheral surface of the flow path pipe 51*m* and the inner peripheral surface of the branch flow path Pa2 when viewed in the direction along the Z axis. Thereby, the branch flow path Pa2 communicates with the inlet IH in a liquid-tight manner. Here, as in the second embodiment, the sealing member 61 is disposed on an extension line LE of the tapered surface 51*m*1 when viewed in the direction orthogonal to the direction along the Z axis.

According to the above fourth embodiment as well, the liquid ejecting head 50C can be regenerated or the head chip 51A can be reused while preventing the misalignment of the head chip 51A.

It is preferable that the inclination angle θ1 and the inclination angle θ2 are substantially the same. The term "substantially the same" as used herein means that a difference between the inclination angle θ1 and the inclination angle θ2 is 10 degrees or less.

5. Fifth Embodiment

Hereinafter, a fifth embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 13:
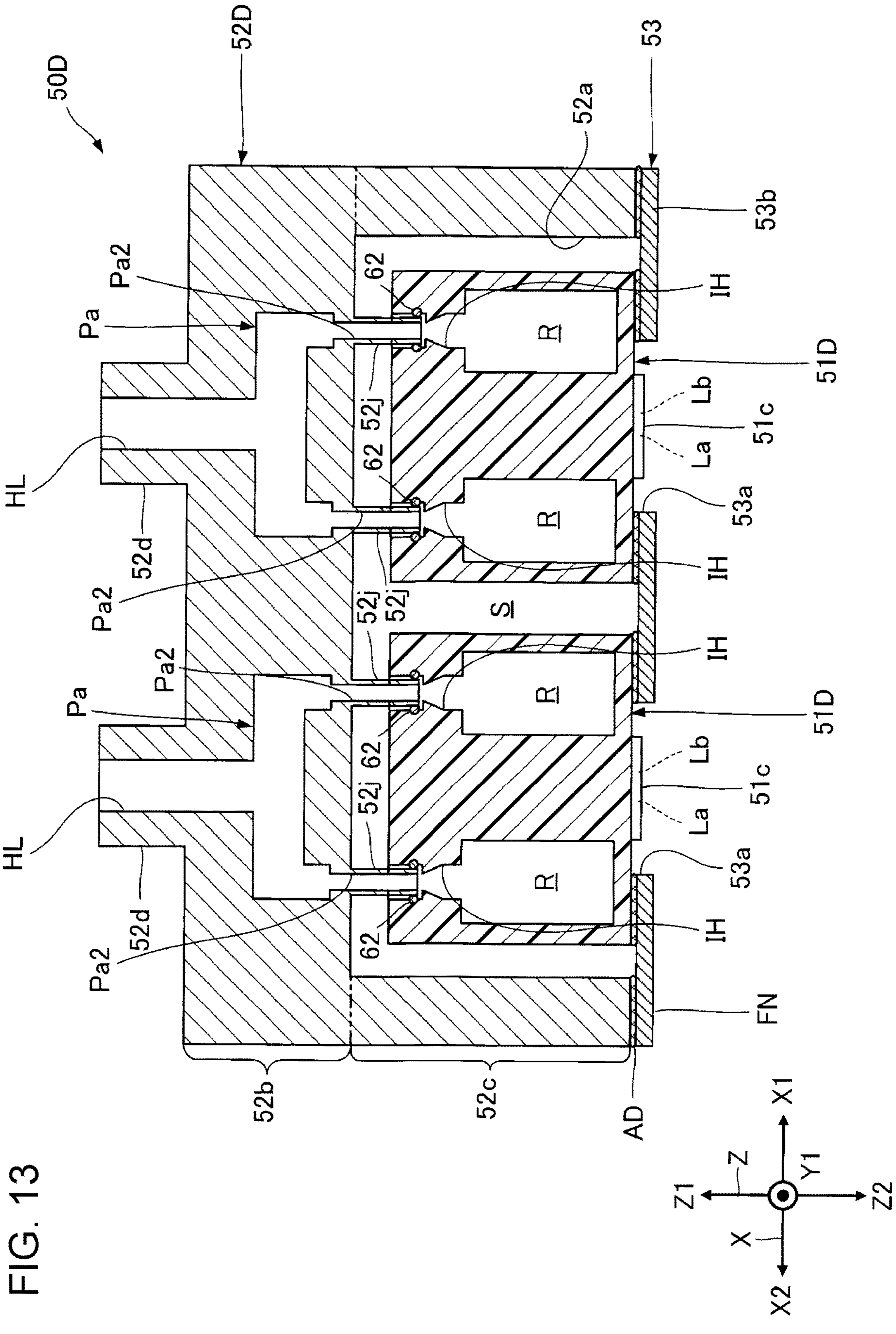
FIG. 13 is a cross-sectional view of a liquid ejecting head according to a fifth embodiment.
Figure 14:
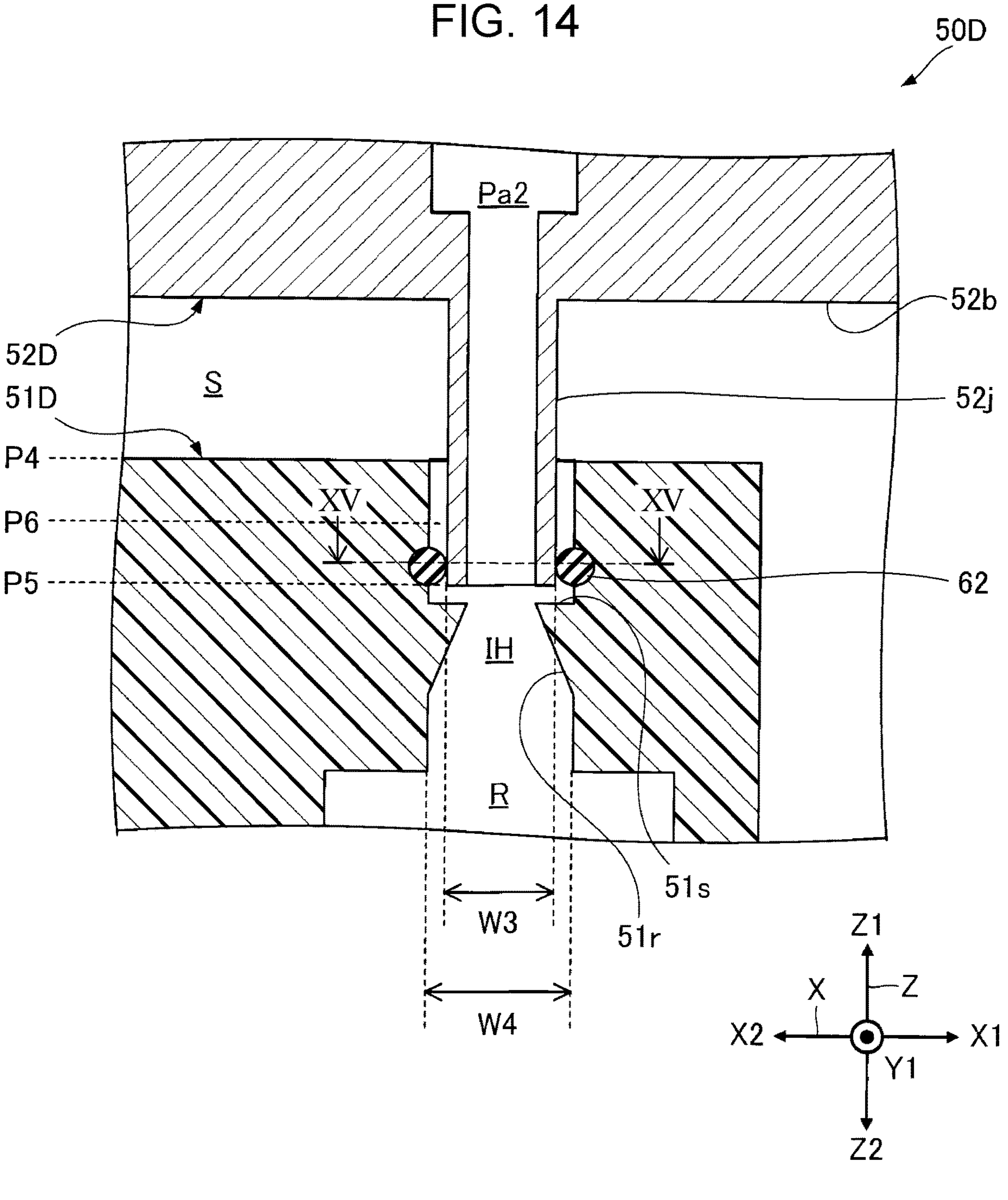
FIG. 14 is an enlarged cross-section for describing a coupling state between a head chip and a holder of the liquid ejecting head according to the fifth embodiment.
Figure 15:
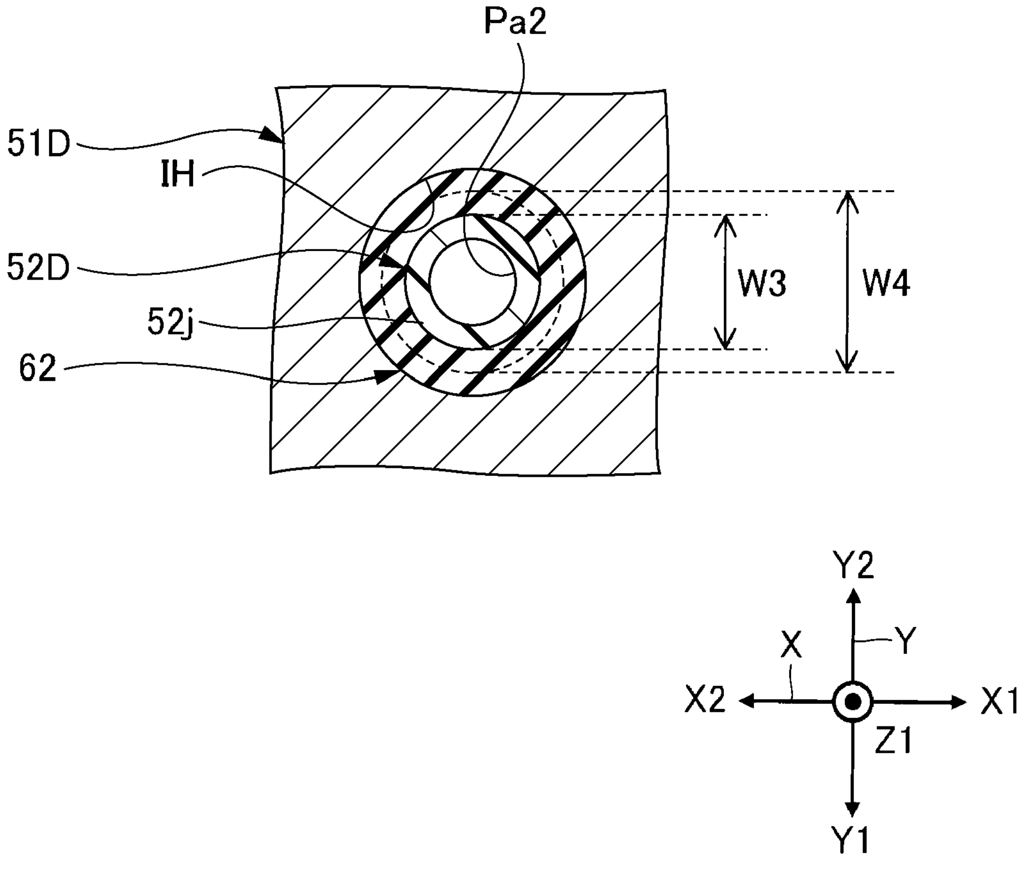
FIG. 15 is a cross-sectional view taken along the line XV-XV in FIG. 14.

FIG. 13 is a cross-sectional view of a liquid ejecting head 50D according to a fifth embodiment. FIG. 14 is an enlarged cross-section for describing a coupling state between a head chip 51D and a flow path structure 52D of the liquid ejecting head 50D according to the fifth embodiment. FIG. 15 is a cross-sectional view taken along the line XV-XV in FIG. 14. The liquid ejecting head 50D has the same configuration as the liquid ejecting head 50 of the first embodiment except that the liquid ejecting head 50D has the head chip 51D instead of the head chip 51 and has the flow path structure 52D instead of the flow path structure 52. The flow path structure 52D is an example of a "holder".

As illustrated in FIGS. 13 to 15, the configuration of the coupling between the head chip 51D and the flow path structure 52D is a configuration in which the configuration of the coupling between the head chip 51 and the flow path structure 52 of the first embodiment is reversed in the direction along the Z axis.

Here, the head chip 51D has the same configuration as the head chip 51 of the first embodiment except that the flow path pipe 51*k* is omitted and an inclined surface 51*r* and a stepped surface 51*s* are added. The flow path structure 52D has the same configuration as the flow path structure 52 of the first embodiment except that the inclined surface 52*f* and the stepped surface 52*e* are omitted and a flow path pipe 52*j* is added.

As illustrated in FIGS. 13 to 15, each flow path pipe 52*j* of the flow path structure 52D is inserted into the inlet IH of the head chip 51D, and an annular sealing member 62 is interposed between an outer peripheral surface of the flow path pipe 52*j* and the inner peripheral surface of the inlet IH. Thereby, the inlet IH and the branch flow path Pa2 are liquid-tightly coupled to each other. The structure related to this coupling will be described below in detail.

Each of a plurality of the flow path pipes 52*j* is a pipe body protruding in the Z2 direction, and the branch flow path Pa2 is provided inside each of the flow path pipes 52*j*. The corresponding branch flow path Pa2 is open to a tip surface of the flow path pipe 52*j*.

In the example illustrated in FIGS. 13 to 15, the flow path pipe 52*j* has a shape extending in the direction along the Z axis with a constant width W3. Thereby, even when a positional relationship between the head chip 51D and the flow path structure 52D in the direction along the Z axis changes slightly in combination with a portion of the branch flow path Pa2 extending with a constant width as will be described below, the fluctuation in a distance between the outer peripheral surface of the flow path pipe 52*j* and the inner peripheral surface of the inlet IH can be reduced. As a result, even when the positional relationship between the head chip 51D and the flow path structure 52D in the direction along the Z axis changes slightly, the fluctuation in the liquid tightness due to the sealing member 62 can be reduced. In addition, the tip surface of the flow path pipe 52*j* is formed along a plane perpendicular to the Z axis. Accordingly, a gap between a stepped surface 51*s*, which will be described below, and the tip surface of the flow path pipe 52*j* can be made uniform.

The flow path pipe 52*j* is not limited to the shape having a constant width, and may have a plurality of portions having different widths or may have curved or bent portions, as long as the flow path pipe 52*j* can be inserted into the inlet IH.

In the example illustrated in FIG. 15, each of shapes of the outer peripheral surface and an inner peripheral surface of the flow path pipe 52*j* when viewed in the direction along the Z axis is circular. Thereby, the stable liquid tightness by the sealing member 62 can be obtained compared to an aspect in which the shape is a shape other than a circular shape. Here, since the shape of the outer peripheral surface of the flow path pipe 52*j* is similar to the shape of the inner peripheral surface of the inlet IH or the sealing member 62 when viewed in the direction along the Z axis, such stable liquid tightness is easily obtained.

Each of the shapes of the outer peripheral surface and the inner peripheral surface of the flow path pipe 52*j* when viewed in the direction along the Z axis is not limited to a circular shape, and may be, for example, an elliptical shape, or a polygonal shape such as a quadrangular shape or a hexagonal shape.

On the other hand, each of a plurality of the inlets IH of the head chip 51D is open to a surface of the head chip 51D facing the Z1 direction.

In the example illustrated in FIG. 14, the inlet IH extends in the direction along the Z axis, and the inclined surface 51*r* and the stepped surface 51*s* are provided on the inner peripheral surface of the inlet IH. The inclined surface 51*r* is formed to reduce a cross-sectional area (that is, a cross-sectional area perpendicular to the Z axis) of the inlet IH as it is directed in the Z1 direction. In addition, the stepped surface 51*s* is a surface perpendicular to the Z axis, and extends outward in a radial direction of the inlet IH from an end of the inclined surface 51*r* in the Z1 direction. Here, the tip surface of the flow path pipe 52*j* faces the stepped surface 51*s*. By providing the inclined surface 51*r* and the stepped surface 51*s* as described above, it is possible to reduce a pressure loss between the branch flow path Pa 2 and the inlet IH, or to reduce the retention of bubbles, components of the ink, or foreign matters in a coupling portion between the branch flow path Pa2 and the inlet IH.

Here, a portion of the inlet IH in the Z1 direction from the stepped surface 51*s* extends in the direction along the Z axis with a constant width W4. Thereby, even when a positional relationship between the head chip 51D and the flow path structure 52D in the direction along the Z axis changes slightly in combination with the flow path pipe 52*j* with a constant width as described above, the fluctuation in a distance between the outer peripheral surface of the flow path pipe 52*j* and the inner peripheral surface of the inlet IH can be reduced. As a result, even when the positional relationship between the head chip 51D and the flow path structure 52D in the direction along the Z axis changes slightly, the fluctuation in the liquid tightness due to the sealing member 62 can be reduced. Here, a gap is formed between a tip of the flow path pipe 52*j* and the stepped surface 51*s*. Thereby, a slight change in the positional relationship between the head chip 51D and the flow path structure 52D in the direction along the Z axis is allowed.

The inclined surface 51*r* and the stepped surface 51*s* may be provided as necessary and may be omitted. In addition, the inlet IH is not limited to the above-described shape, and may have, for example, a curved or bent portion.

The width W4 of the inlet IH is larger than the width W3 of the flow path pipe 52*j*. The width W3 is a width of the flow path pipe 52*j* in any one direction perpendicular to the Z axis. In addition, the width W4 is a width of the opening of the inlet IH in the one direction. A difference between the width W3 and the width W4 is determined depending on the shape, size, or constituent material of the sealing member 62, is not particularly limited, and is set in any desired way.

In the example illustrated in FIG. 15, the shape of the inner peripheral surface of the inlet IH when viewed in the direction along the Z axis is circular. That is, the shape is similar to the shape of the outer peripheral surface of the flow path pipe 52*j*. Therefore, even when the sealing member 62 is an O-ring-shaped member, the stable liquid tightness by the sealing member 62 can be obtained.

The shape of the inner peripheral surface of the inlet IH when viewed in the direction along the Z axis is not limited to a circular shape, and may be, for example, an elliptical shape, or a polygonal shape such as a quadrangular shape or a hexagonal shape. In addition, when viewed in the direction along the Z axis, the shape of the inner peripheral surface of the inlet IH may be different from the shape of the outer peripheral surface of the flow path pipe 52*j*.

The flow path pipe 52*j* is inserted into the above inlet IH. Here, the sealing member 62 is disposed between the outer peripheral surface of the flow path pipe 52*j* and the inner peripheral surface of the inlet IH when viewed in the direction along the Z axis. The sealing member 62 is not interposed between the head chip 51D and the flow path pipe 52*j* in the direction along the Z axis.

The sealing member 62 is an annular elastic member disposed between the outer peripheral surface of the flow path pipe 52*j* and the inner peripheral surface of the inlet IH. The sealing member 62 is made of the same elastic material as the sealing member 61 of the first embodiment. The sealing member 62 is disposed in an elastically deformed state by being interposed between the outer peripheral surface of the flow path pipe 52*j* and the inner peripheral surface of the inlet IH. Thereby, the flow path pipe 52*j* and the head chip 51D are liquid-tightly coupled to each other via the sealing member 62.

In the example illustrated in FIGS. 13 to 15, the sealing member 62 is an O-ring-shaped member, and is integrally formed with the head chip 51D by insert molding or the like. Thereby, even when the flow path pipe 52*j* is inserted into or removed from the inlet IH, the sealing member 62 can be fixed at a desired position in the inlet IH. In addition, when the head chip 51D is replaced, the sealing member 62 can also be replaced together. As a result, it is possible to improve the sealing reliability of the liquid ejecting head 50D after the replacement. The sealing member 62 may be fixed to the flow path pipe 52*j*, as described in Modification Example 2 below. In addition, the shape of the sealing member 62 when viewed in the direction along the Z axis may be any shape as long as the flow path pipe 52*j* and the head chip 51D can be liquid-tightly coupled to each other, and is not limited to the illustrated example, and is set in any desired way.

In addition, as illustrated in FIG. 14, the sealing member 62 is disposed at a position in the Z2 direction from a center position P6 between the opening of the inlet IH and the tip of the flow path pipe 52*j*. The center position P6 is a midpoint between a position P5 of the tip of the flow path pipe 52*j* in the direction along the Z axis and a position P4 of the opening of the inlet IH in the direction along the Z axis. The sealing member 62 is located between the position P5 and the center position P6. The disposition of the sealing member 62 is not particularly limited as long as the flow path pipe 52*j* and the head chip 51D can be liquid-tightly coupled to each other.

An inner diameter of the sealing member 62 in a natural state in which the flow path pipe 52*j* is removed from the head chip 51D is smaller than the width W3 of the outer peripheral surface of the flow path pipe 52*j*. Thereby, the flow path pipe 52*j* and the head chip 51D can be liquid-tightly coupled to each other by the elastic deformation of the sealing member 62. The inner diameter is set such that a load applied to the sealing member 62 in a circumferential direction of the flow path pipe 52*j* due to this elastic deformation is smaller than fixing force of the fixed plate 53 to the head chip 51D in the direction perpendicular to the Z axis. As a result, the head chip 51D is prevented from coming off from the fixed plate 53 due to the reaction force due to the elastic deformation of the sealing member 62.

As described above, the above-described liquid ejecting head 50D includes the plurality of head chips 51D, the fixed plate 53, and the flow path structure 52D which is an example of a "holder". Each of the plurality of head chips 51D has the nozzle plate 51*c*. The nozzle plate 51*c* is provided with the plurality of nozzles N that eject an ink, which is an example of a "liquid", in the Z2 direction, which is an example of a "first direction". The fixed plate 53 has the flat plate portion 53*b*. The flat plate portion 53*b* is provided with the plurality of exposure opening portions 53*a* for exposing, to the outside, at least a portion of each of the plurality of nozzle plates 51*c*, and has the plurality of head chips 51D fixed thereto. The flow path structure 52D has the flow path forming portion 52*b* and the wall portion 52*c*. The flow path forming portion 52*b* is provided with the "plurality of branch flow paths Pa2", which is an example of the "plurality of first coupling flow paths" that is open in the Z2 direction. The wall portion 52*c* protrudes from the flow path forming portion 52*b* in the Z2 direction and is fixed to the flat plate portion 53*b*.

Here, the plurality of head chips 51D are accommodated in the accommodation space S defined by the flat plate portion 53*b*, the flow path forming portion 52*b*, and the wall portion 52*c*. The head chip 51D has the inlet IH, which is an example of the "second coupling flow path" communicating with at least a portion of the plurality of nozzles N. The flow path forming portion 52*b* has the flow path pipe 52*j* protruding in the Z2 direction. The branch flow path Pa2 is provided inside the flow path pipe 52*j*. In a state where the flow path pipe 52*j* is inserted into the inlet IH, the branch flow path Pa2 communicates with the inlet IH in a liquid-tight manner via the elastic sealing member 62 disposed between the inner peripheral surface of the inlet IH and the outer peripheral surface of the flow path pipe 52*j* when viewed in the Z1 direction.

In the liquid ejecting head 50D described above, since the branch flow path Pa2 communicates with the inlet IH in a liquid-tight manner via the elastic sealing member 62, there is no need to adhere the head chip 51D and the flow path structure 52D to each other in order to couple these flow paths. Therefore, the head chip 51D can be detachably attached to the flow path structure 52D. Accordingly, the head chip 51D can be suitably replaced.

Moreover, since the elastic sealing member 62 is disposed between the inner peripheral surface of the inlet IH and the outer peripheral surface of the flow path pipe 52*j* when viewed in the Z2 direction, it is possible to reduce the reaction force due to the elastic deformation during sealing of the sealing member 62, which is applied to the fixed plate 53 in the Z2 direction via the head chip 51D, compared to an aspect in which the sealing member interposed between the head chip 51D and the flow path structure 52D in the Z2 direction is used. Therefore, the deformation of the fixed plate 53 can be reduced.

Here, when the flow path pipe 52*j* is inserted into the inlet IH after the fixed plate 53 and the head chip 51D are adhered to each other, the reaction force due to the elastic deformation during sealing of the sealing member 62 may be applied to the fixed plate 53 in the direction intersecting the Z2 direction via the head chip 51D. However, since the axial rigidity of the fixed plate 53 is higher than the shear rigidity, even when such reaction force is applied to the fixed plate 53, the fixed plate 53 is difficult to deform. As described above, the head chip 51D can be replaced while reducing the deformation of the fixed plate 53.

In the present embodiment, as described above, the sealing member 62 is disposed at a position in the Z1 direction from the center position P6 between the opening of the inlet IH and the tip of the flow path pipe 52*j*. Therefore, a portion of a gap between the inner peripheral surface of the inlet IH and the outer peripheral surface of the flow path pipe 52*j* that communicates with the flow path can be reduced. As a result, it is possible to suppress the retention of bubbles and the sedimentation of components of the liquid in the flow path.

In addition, as described above, the sealing member 62 is not interposed between the head chip 51D and the flow path pipe 52*j* in the Z2 direction. Accordingly, it is possible to reduce the reaction force due to the elastic deformation during sealing of the sealing member 62, which is applied to the fixed plate 53 in the Z2 direction via the head chip 51D.

Furthermore, as described above, the load applied to the sealing member 62 in the circumferential direction of the flow path pipe 52*j* is smaller than the fixing force of the fixed plate 53 to the head chip 51D in the direction perpendicular to the Z2 direction. Accordingly, the head chip 51D is prevented from being separated from the fixed plate 53.

6. Sixth Embodiment

Hereinafter, a sixth embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 16:
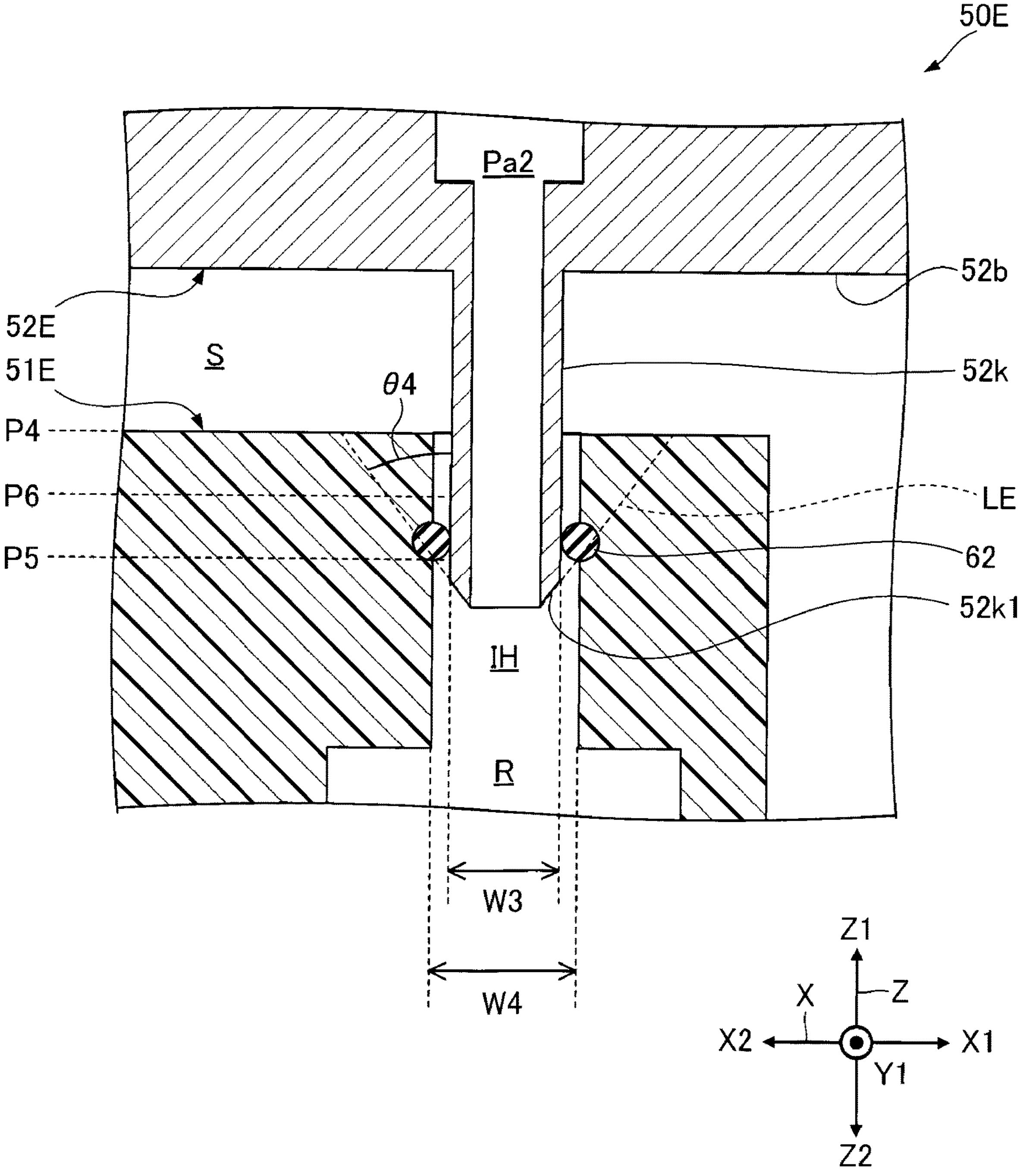
FIG. 16 is an enlarged cross-section for describing a coupling state between a head chip and a holder of a liquid ejecting head according to a sixth embodiment.

FIG. 16 is an enlarged cross-section for describing a coupling state between a head chip 51E and a flow path structure 52E of a liquid ejecting head 50E according to a sixth embodiment. The liquid ejecting head 50E has the same configuration as the liquid ejecting head 50D of the fifth embodiment except that the liquid ejecting head 50E has the head chip 51E instead of the head chip 51D and has the flow path structure 52E instead of the flow path structure 52D. The flow path structure 52E is an example of a "holder".

The flow path structure 52E has the same configuration as the flow path structure 52D of the fifth embodiment except that the flow path structure 52E has a flow path pipe 52*k* instead of the flow path pipe 52*j*. The flow path pipe 52*k* has the same configuration as the flow path pipe 52*j* of the fifth embodiment except that the flow path pipe 52*k* has a tapered surface 52*k*1.

The tapered surface 52*k*1 is provided on the outer peripheral surface of the flow path pipe 52*k* to reduce a cross-sectional area of the flow path pipe 52*k* perpendicular to the Z2 direction toward a tip. An inclination angle θ4 of the tapered surface 52*k*1 with respect to the Z axis is not particularly limited, but from the viewpoint of facilitating the insertion and removal of the flow path pipe 52*k* with respect to the inlet IH, the inclination angle θ4 is, for example, in a range of 8° or more and 50° or less, and preferably in a range of 20° or more and 45° or less. A shape of the tapered surface 52*k*1 is not limited to the illustrated example, and may be, for example, a curved shape when viewed in a cross section including the central axis of the flow path pipe 52*k*.

The head chip 51E has the same configuration as the head chip 51D of the fifth embodiment except that the inclined surface 51*r* and the stepped surface 51*s* are omitted. The head chip 51E may have the inclined surface 51*r* and the stepped surface 51*s*, as with the head chip 51D of the fifth embodiment.

The flow path pipe 52*k* is inserted into the inlet IH of the head chip 51E. Here, the sealing member 62 is disposed between the outer peripheral surface of the flow path pipe 52*k* and the inner peripheral surface of the inlet IH when viewed in the direction along the Z axis. Thereby, the branch flow path Pa2 communicates with the inlet IH in a liquid-tight manner.

Here, as in the fifth embodiment, the sealing member 62 is formed at the inner peripheral surface of the inlet IH to be integrated with the inlet IH, and is disposed on an extension line LE of the tapered surface 52*k*1 when viewed in the direction orthogonal to the direction along the Z axis.

According to the above sixth embodiment as well, the liquid ejecting head 50E can be regenerated or the head chip 51E can be reused while preventing the misalignment of the head chip 51E. In the present embodiment, as described above, the sealing member 62 is formed at the inner peripheral surface of the inlet IH to be integrated with the inlet IH. In addition, the outer peripheral surface of the flow path pipe 52*k* has the tapered surface 52*k*1 to reduce the cross-sectional area of the flow path pipe 52*k* perpendicular to the Z2 direction toward the tip. Therefore, the insertability of the flow path pipe 52*k* into the inlet IH can be improved compared to the aspect in which the flow path pipe 52*j* with a constant width is used as in the fifth embodiment. In addition, since the sealing member 62 is formed at the inner peripheral surface of the inlet IH to be integrated with the inlet IH, the sealing member 62 can be stably disposed at a desired position in the inlet IH.

As described above, the sealing member 62 of the present embodiment is disposed on the extension line of the tapered surface 52*k*1 when viewed in the direction orthogonal to the Z2 direction. Therefore, a portion of a gap between the inner peripheral surface of the inlet IH and the outer peripheral surface of the flow path pipe 52*k* that communicates with the flow path can be reduced. As a result, it is possible to suppress the retention of bubbles and the sedimentation of components of the liquid in the flow path.

When the flow path pipe 52*k* has the tapered surface 52*k*1 as in the present embodiment, it is preferable that elastic force of the sealing member 62 is prevented from acting on the tapered surface 52*k*1 by preventing the sealing member 62 from contacting the tapered surface 52*k*1.

7. Seventh Embodiment

Hereinafter, a seventh embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 17:
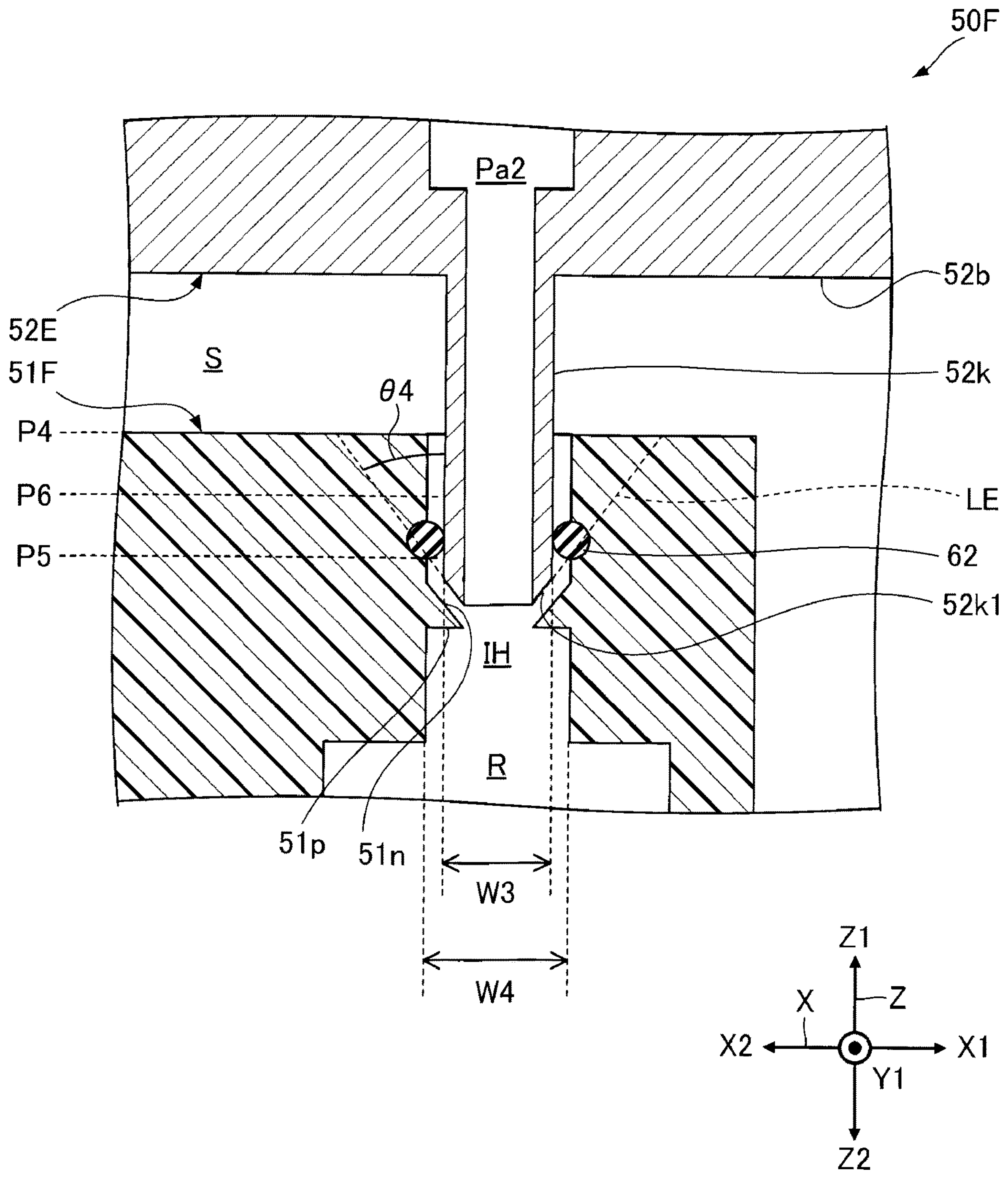
FIG. 17 is an enlarged cross-section for describing a coupling state between a head chip and a holder of a liquid ejecting head according to a seventh embodiment.

FIG. 17 is an enlarged cross-section for describing a coupling state between a head chip 51F and a flow path structure 52E of a liquid ejecting head 50F according to a seventh embodiment. The liquid ejecting head 50F has the same configuration as the liquid ejecting head 50D of the fifth embodiment except that the liquid ejecting head 50F has the head chip 51F instead of the head chip 51D and has the flow path structure 52E instead of the flow path structure 52D. The flow path structure 52E is an example of a "holder", and has the same configuration as the flow path structure 52E of the sixth embodiment.

The head chip 51F has the same configuration as the head chip 51D of the fifth embodiment except that the head chip 51F has an inclined surface 51*n* and a stepped surface 51*p* instead of the inclined surface 51*r* and the stepped surface 51*s*.

The inclined surface 51*n* and the stepped surface 51*p* are provided on the inner peripheral surface of the inlet IH. The inclined surface 51*n* is formed to reduce a cross-sectional area (that is, a cross-sectional area perpendicular to the Z axis) of the inlet IH as it is directed in the Z2 direction. In addition, the stepped surface 51*p* is a surface perpendicular to the Z axis, and extends outward in a radial direction of the inlet IH from an end of the inclined surface 51*n* in the Z2 direction. Here, the inclined surface 51*n* has a shape along the tapered surface 52*k*1 of the flow path pipe 51*k*, and the tapered surface 52*k*1 faces the inclined surface 51*n*. By providing such an inclined surface 51*n*, it is possible to reduce a gap between the tapered surface 52*k*1 and the inner peripheral surface of the inlet IH.

The flow path pipe 52*k* is inserted into the inlet IH of the head chip 51F. Here, the sealing member 62 is disposed between the outer peripheral surface of the flow path pipe 52*k* and the inner peripheral surface of the inlet IH when viewed in the direction along the Z axis. Thereby, the branch flow path Pa2 communicates with the inlet IH in a liquid-tight manner. Here, as in the sixth embodiment, the sealing member 62 is disposed on an extension line LE of the tapered surface 52*k*1 when viewed in the direction orthogonal to the direction along the Z axis.

According to the above seventh embodiment as well, the liquid ejecting head 50F can be regenerated or the head chip 51F can be reused while preventing the misalignment of the head chip 51F. In the present embodiment, as described above, the flow path structure 52E has the inclined surface 51*n* facing the tapered surface 52*k*1 and formed along the tapered surface 52*k*1 in the inlet IH. Therefore, a portion of a gap between the inner peripheral surface of the inlet IH and the outer peripheral surface of the flow path pipe 52*k* that communicates with the flow path can be reduced. As a result, it is possible to suppress the retention of bubbles and the sedimentation of components of the liquid in the flow path.

8. Eighth Embodiment

Hereinafter, an eighth embodiment of the present disclosure will be described. In the embodiment exemplified below, elements whose actions and functions are similar to those of the first embodiment will be denoted by the same reference numerals used in the description of the first embodiment, and detailed description thereof will be omitted as appropriate.

Figure 18:
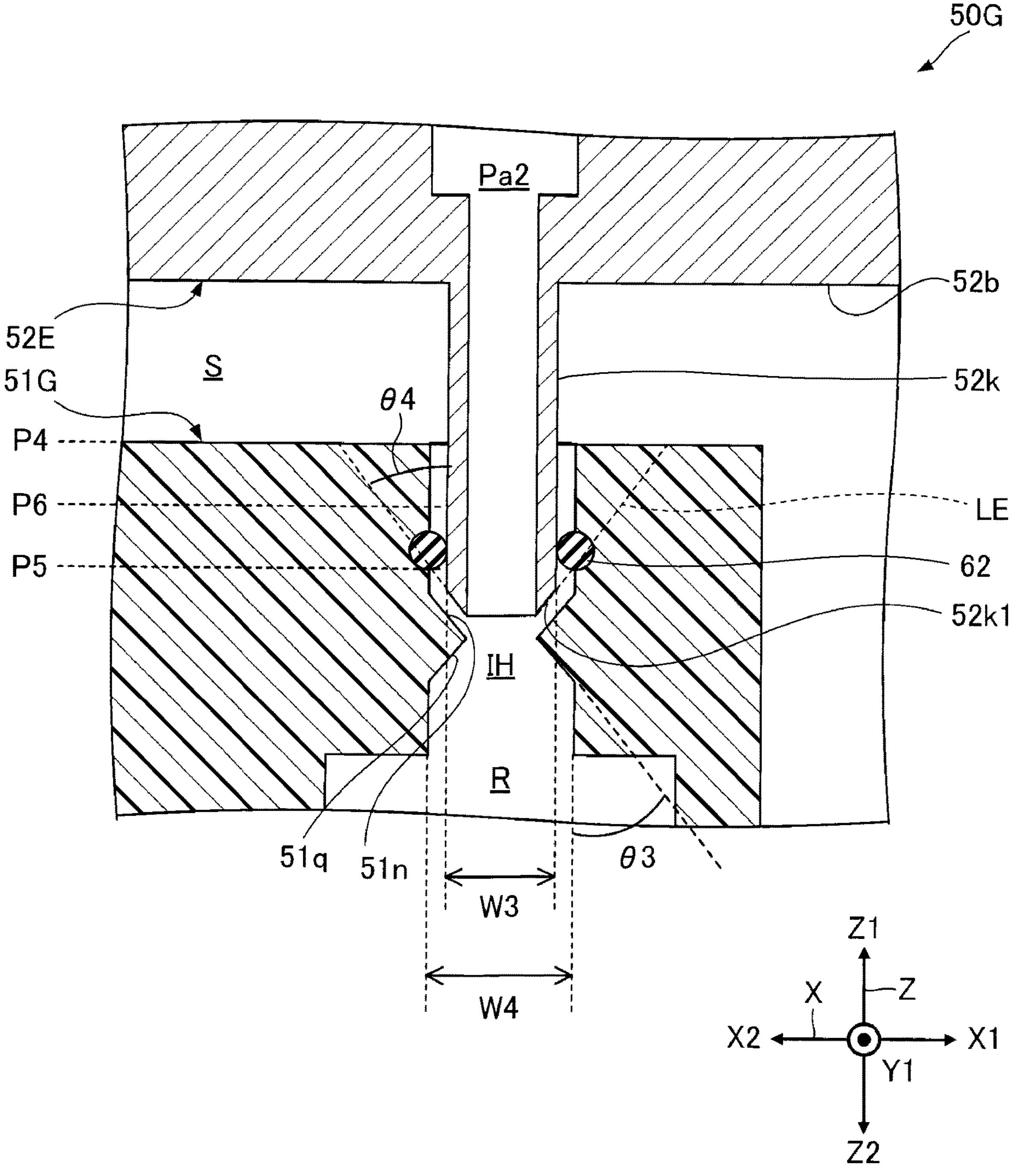
FIG. 18 is an enlarged cross-section for describing a coupling state between a head chip and a holder of a liquid ejecting head according to an eighth embodiment.

FIG. 18 is an enlarged cross-section for describing a coupling state between a head chip 51G and a flow path structure 52E of a liquid ejecting head 50G according to an eighth embodiment. The liquid ejecting head 50G has the same configuration as the liquid ejecting head 50D of the fifth embodiment except that the liquid ejecting head 50G has the head chip 51G instead of the head chip 51D and has the flow path structure 52E instead of the flow path structure 52D. The flow path structure 52E is an example of a "holder", and has the same configuration as the flow path structure 52D of the fifth embodiment.

The head chip 51G has the same configuration as the head chip 51F of the seventh embodiment except that the head chip 51G has an inclined surface 51*q* instead of the stepped surface 51*p*.

The inclined surface 51*q* is provided on the inner peripheral surface of the inlet IH, and is formed to reduce a cross-sectional area (that is, a cross-sectional area perpendicular to the Z axis) of the inlet IH as it is directed in the Z2 direction from the end of the inclined surface 51*n* in the Z2 direction. By providing such an inclined surface 51*q*, it is possible to reduce the pressure loss between the branch flow path Pa2 and the inlet IH.

The flow path pipe 52*k* is inserted into the inlet IH of the head chip 51G. Here, the sealing member 62 is disposed between the outer peripheral surface of the flow path pipe 52*k* and the inner peripheral surface of the inlet IH when viewed in the direction along the Z axis. Thereby, the branch flow path Pa2 communicates with the inlet IH in a liquid-tight manner. Here, as in the sixth embodiment, the sealing member 62 is disposed on an extension line LE of the tapered surface 52*k*1 when viewed in the direction orthogonal to the direction along the Z axis.

According to the above eighth embodiment as well, the liquid ejecting head 50G can be regenerated or the head chip 51G can be reused while preventing the misalignment of the head chip 51G.

An inclination angle θ3 of the inclined surface 51*n* with respect to a central axis of the inlet IH is not particularly limited, but from the viewpoint of suitably obtaining the reduction of the pressure loss and the reduction of the retention, the inclination angle θ3 is, for example, in a range of 8° or more and 50° or less, and preferably in a range of 20° or more and 45° or less. It is preferable that the inclination angle θ3 and the inclination angle θ4 are substantially the same. The term "substantially the same" as used herein means that a difference between the inclination angle θ3 and the inclination angle θ4 is 10 degrees or less.

9. Modification Examples

The forms exemplified above can be modified in various ways. Specific modified aspects that may be applied to the above-described embodiments are exemplified below. Any two or more aspects selected from the following examples can be combined as appropriate as long as there is no contradiction.

9-1. Modification Example 1

Figure 19:
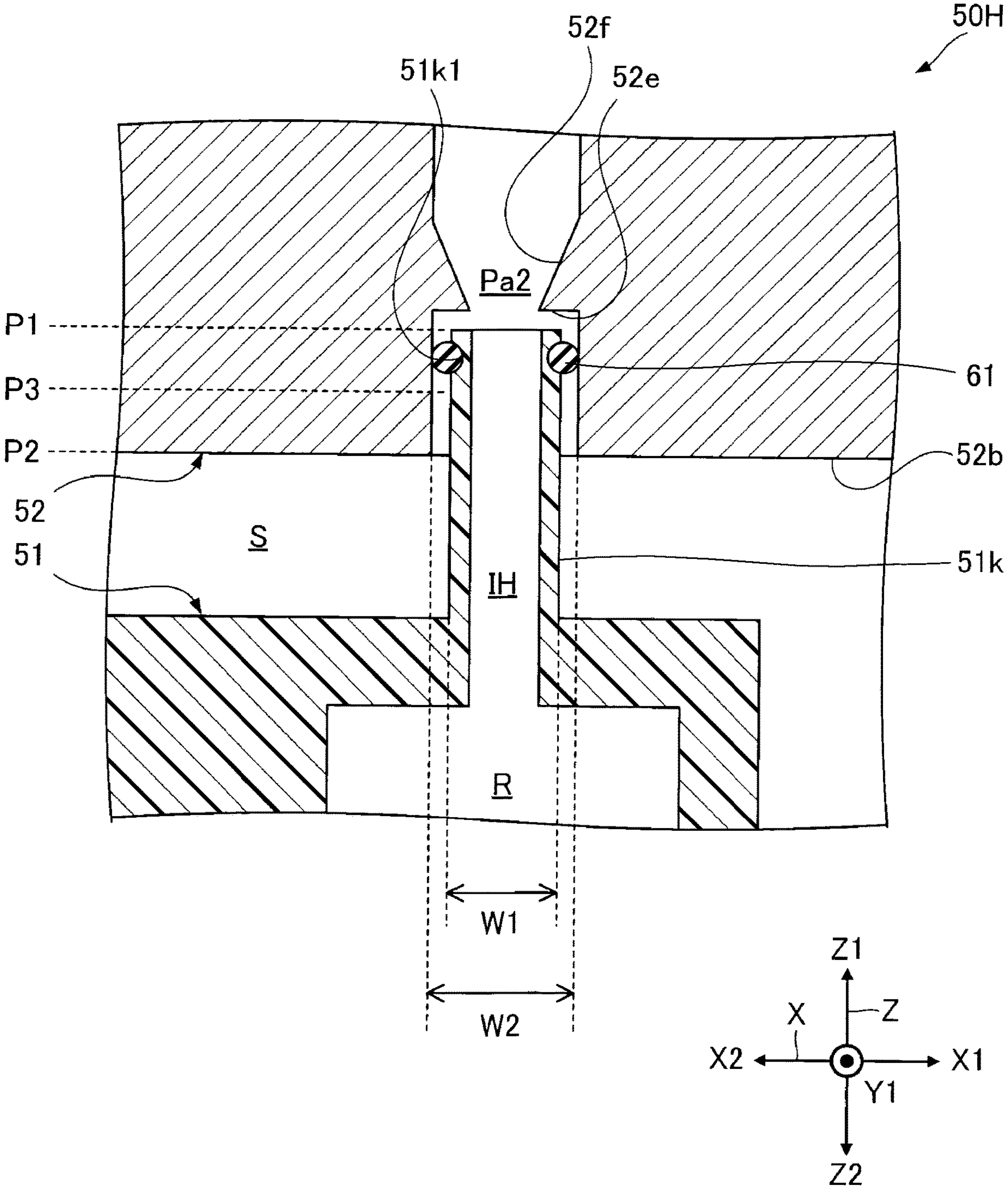
FIG. 19 is an enlarged cross-section for describing a coupling state between a head chip and a holder of a liquid ejecting head according to Modification Example 1.

FIG. 19 is an enlarged cross-section for describing a coupling state between a head chip 51 and a flow path structure 52 of a liquid ejecting head 50H according to Modification Example 1. The liquid ejecting head 50H has the same configuration as the liquid ejecting head 50 of the first embodiment except that the sealing member 61 is fixed to the flow path pipe 51*k*. As in Modification Example 1, in the second to fourth embodiments, the sealing member 61 may be fixed to the flow path pipe 51*m*.

A groove 51*k*1 extending in the circumferential direction is provided on the outer peripheral surface of the flow path pipe 51*k* of Modification Example 1. An inner peripheral portion of the sealing member 61 is accommodated in the groove 51*k*1. Here, the sealing member 61 may be simply fitted into the groove 51*k*1, or may be integrally formed with the flow path pipe 51*k* by insert molding or the like.

According to Modification Example 1 as well, the liquid ejecting head 50 can be regenerated or the head chip 51 can be reused while preventing the misalignment of the head chip 51. In Modification Example 1, as described above, when the sealing member 61 is integrally formed with the flow path pipe 51*k*, it is possible to prevent fluctuation in the position of the sealing member 61 with respect to the flow path pipe 51*k* in the Z2 direction. In addition, when the head chip 51 is replaced, the sealing member 61 can also be replaced together. As a result, it is possible to improve the sealing reliability of the liquid ejecting head 50H after the replacement.

In addition, in Modification Example 1, as described above, the outer peripheral surface of the flow path pipe 51*k* has the annular groove 51*k*1 for accommodating the sealing member 61 over the entire circumference. Therefore, even when the sealing member 61 is not integrally formed with the flow path pipe 51*k*, it is possible to prevent fluctuation in the position of the sealing member 61 with respect to the flow path pipe 51*k* in the Z2 direction. In addition, by simply fitting the sealing member 61 into the groove 51*k*1, only the sealing member 61 can be replaced.

9-2. Modification Example 2

Figure 20:
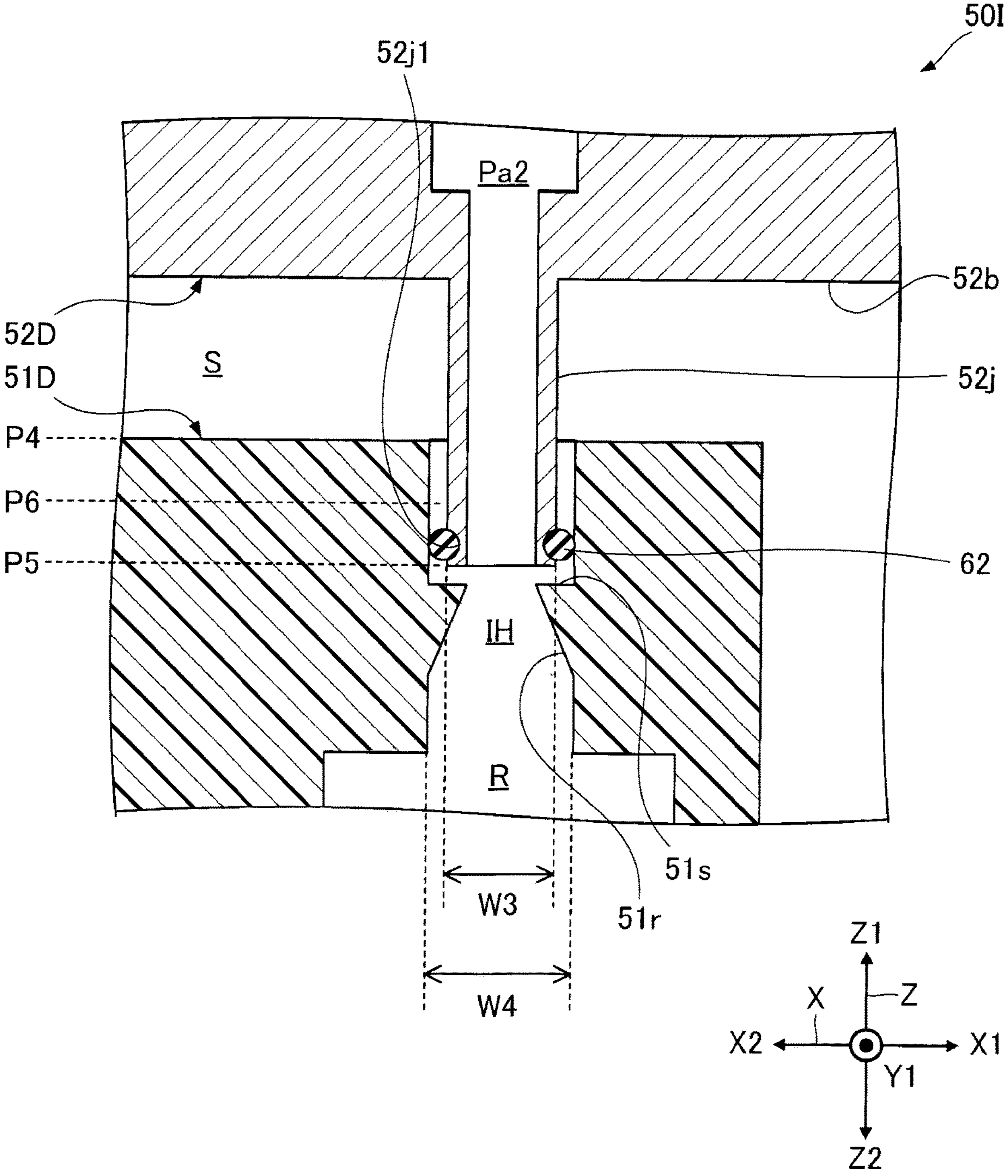
FIG. 20 is an enlarged cross-section for describing a coupling state between a head chip and a holder of a liquid ejecting head according to Modification Example 2.

FIG. 20 is an enlarged cross-section for describing a coupling state between a head chip 51D and a flow path structure 52D of a liquid ejecting head 50I according to Modification Example 2. The liquid ejecting head 50I has the same configuration as the liquid ejecting head 50D of the fifth embodiment except that the sealing member 62 is fixed to the flow path pipe 52*j*. As in Modification Example 2, in the sixth to eighth embodiments, the sealing member 62 may be fixed to the flow path pipe 52*k*.

A groove **52*j*1 extending in the circumferential direction is provided on the outer peripheral surface of the flow path pipe 52*j* of Modification Example 2. An inner peripheral portion of the sealing member 62 is accommodated in the groove 52*j*1. Here, the sealing member 62 may be simply fitted into the groove 52*j*1, or may be integrally formed with the flow path pipe 52*j*** by insert molding or the like.

According to Modification Example 2 as well, the liquid ejecting head 50I can be regenerated or the head chip 51D can be reused while preventing the misalignment of the head chip 51D. In Modification Example 2, as described above, when the sealing member 62 is integrally formed with the flow path pipe **52*j*, it is possible to prevent fluctuation in the position of the sealing member 62 with respect to the flow path pipe 52*j*** in the Z2 direction.

In addition, in Modification Example 2, as described above, the outer peripheral surface of the flow path pipe **52*j* has the annular groove 52*j*1 for accommodating the sealing member 62 over the entire circumference. Therefore, even when the sealing member 62 is not integrally formed with the flow path pipe 52*j*, it is possible to prevent fluctuation in the position of the sealing member 62 with respect to the flow path pipe 52*j* in the Z2 direction. In addition, by simply fitting the sealing member 62 into the groove 52*j*1, only the sealing member 62** can be replaced.

9-3. Modification Example 3

In the above-described embodiments, the branch flow path Pa2, which is a flow path for supplying the ink from the flow path forming portion **52*b* of the flow path structure 52 to the head chip 51, is an example of the "first coupling flow path", but a flow path for recovering the ink from the head chip 51 to the flow path forming portion 52*b* of the flow path structure 52 may be an example of the "first coupling flow path". Similarly, in the above-described embodiments, the inlet IH, which is a flow path for introducing the ink from the flow path forming portion 52*b* of the flow path structure 52 into the head chip 51, is an example of the "second coupling flow path", but the outlet, which is a flow path for causing the ink to flow out from the head chip 51 to the flow path forming portion 52*b* of the flow path structure 52**, may be an example of the "first coupling flow path".

9-4. Modification Example 4

In the above-described embodiments, an aspect in which the liquid ejecting head is a line type is exemplified, but the present disclosure is not limited to this aspect, and the liquid ejecting head may be a serial type in which the liquid ejecting head reciprocates in a width direction of the medium M.

9-5. Modification Example 5

The liquid ejecting apparatus exemplified in the above-described embodiments can be adopted in various types of apparatuses such as a facsimile apparatus and a copy machine, in addition to an apparatus dedicated to printing. However, the application of the liquid ejecting apparatus is not limited to the printing. For example, a liquid ejecting apparatus that ejects a solution of a coloring material is used as a manufacturing apparatus that forms a color filter of a display apparatus such as a liquid crystal display panel. In addition, a liquid ejecting apparatus that ejects a solution of a conductive material is used as a manufacturing apparatus that forms wirings or electrodes on a wiring substrate. In addition, a liquid ejecting apparatus that ejects a solution of an organic substance related to a living body is used, for example, as a manufacturing apparatus that manufactures a biochip.

What is claimed is:

1. A liquid ejecting head comprising:

a plurality of head chips each having a nozzle plate provided with a plurality of nozzles configured to eject a liquid in a first direction;

a fixed plate having a flat plate portion that is provided with a plurality of exposure opening portions for exposing, to an outside, at least a portion of each of a plurality of the nozzle plates and to which the plurality of head chips are fixed; and a holder having a flow path forming portion provided with a plurality of first coupling flow paths that are open in the first direction and a wall portion protruding from the flow path forming portion in the first direction and fixed to the flat plate portion, wherein the plurality of head chips are accommodated in an accommodation space defined by the flat plate portion, the flow path forming portion, and the wall portion, at least one head chip among the plurality of head chips has a flow path pipe in which a second coupling flow path is provided and which protrudes in a second direction opposite to the first direction, and in a state where the flow path pipe is inserted into any one first coupling flow path among the plurality of first coupling flow paths, the one first coupling flow path communicates with the second coupling flow path in a liquid-tight manner via an elastic sealing member disposed between an inner peripheral surface of the one first coupling flow path and an outer peripheral surface of the flow path pipe when viewed in the first direction.

2. The liquid ejecting head according to claim 1, wherein the sealing member is disposed at a position in the second direction from a center position between an opening of the one first coupling flow path and a tip of the flow path pipe.

3. The liquid ejecting head according to claim 1, wherein the sealing member is integrally formed with the flow path pipe.

4. The liquid ejecting head according to claim 1, wherein the sealing member is not interposed between the holder and the flow path pipe in the first direction.

5. The liquid ejecting head according to claim 1, wherein the sealing member is formed at the inner peripheral surface of the one first coupling flow path to be integrated with the one first coupling flow path, and the outer peripheral surface of the flow path pipe has a tapered surface to reduce a cross-sectional area of the flow path pipe perpendicular to the first direction toward a tip.

6. The liquid ejecting head according to claim 5, wherein the sealing member is disposed on an extension line of the tapered surface when viewed in a direction orthogonal to the first direction.

7. The liquid ejecting head according to claim 5, wherein the holder has an inclined surface facing the tapered surface and formed along the tapered surface in the one first coupling flow path.

8. The liquid ejecting head according to claim 1, wherein the sealing member has an annular shape, and the outer peripheral surface of the flow path pipe has an annular groove for accommodating the sealing member over an entire circumference.

9. The liquid ejecting head according to claim 1, wherein a load applied to the sealing member in a circumferential direction of the flow path pipe is smaller than a fixing force of the fixed plate to the head chip in a direction perpendicular to the first direction.

10. A liquid ejecting head comprising:

a plurality of head chips each having a nozzle plate provided with a plurality of nozzles configured to eject a liquid in a first direction;

a fixed plate having a flat plate portion that is provided with a plurality of exposure opening portions for exposing, to an outside, at least a portion of each of a plurality of the nozzle plates and to which the plurality of head chips are fixed; and a holder having a flow path forming portion provided with a plurality of first coupling flow paths that are open in the first direction and a wall portion protruding from the flow path forming portion in the first direction and fixed to the flat plate portion, wherein the plurality of head chips are accommodated in an accommodation space defined by the flat plate portion, the flow path forming portion, and the wall portion, at least one head chip among the plurality of head chips has a second coupling flow path communicating with at least a portion of the plurality of nozzles, the flow path forming portion has a flow path pipe in which any one first coupling flow path among the plurality of first coupling flow paths is provided and which protrudes in the first direction, and in a state where the flow path pipe is inserted into the second coupling flow path, the one first coupling flow path communicates with the second coupling flow path in a liquid-tight manner via an elastic sealing member disposed between an inner peripheral surface of the second coupling flow path and an outer peripheral surface of the flow path pipe when viewed in the first direction.

11. The liquid ejecting head according to claim 10, wherein the sealing member is disposed at a position in the first direction from a center position between an opening of the second coupling flow path and a tip of the flow path pipe.

12. The liquid ejecting head according to claim 10, wherein the sealing member is integrally formed with the flow path pipe.

13. The liquid ejecting head according to claim 10, wherein the sealing member is not interposed between the head chip and the flow path pipe in the first direction.

14. The liquid ejecting head according to claim 10, wherein the sealing member is formed at the inner peripheral surface of the second coupling flow path to be integrated with the second coupling flow path, and the outer peripheral surface of the flow path pipe has a tapered surface to reduce a cross-sectional area of the flow path pipe perpendicular to the first direction toward a tip.

15. The liquid ejecting head according to claim 14, wherein the sealing member is disposed on an extension line of the tapered surface when viewed in a direction orthogonal to the first direction.

16. The liquid ejecting head according to claim 14, wherein the holder has an inclined surface facing the tapered surface and formed along the tapered surface in the second coupling flow path.

17. The liquid ejecting head according to claim 10, wherein the sealing member has an annular shape, and the outer peripheral surface of the flow path pipe has an annular groove for accommodating the sealing member over an entire circumference.

18. The liquid ejecting head according to claim 10, wherein a load applied to the sealing member in a circumferential direction of the flow path pipe is smaller than a fixing force of the fixed plate to the head chip in a direction perpendicular to the first direction.

19. A liquid ejecting apparatus comprising:

the liquid ejecting head according to claim 1; and a controller controlling an operation of the liquid ejecting head.

20. A liquid ejecting apparatus comprising:

the liquid ejecting head according to claim 10; and a controller controlling an operation of the liquid ejecting head.

* * * * *